United States Patent
Ikeuchi et al.

(10) Patent No.: US 7,981,833 B2
(45) Date of Patent: Jul. 19, 2011

(54) AQUEOUS-LIQUID-ABSORBING AGENT AND ITS PRODUCTION PROCESS

(75) Inventors: Hiroyuki Ikeuchi, Himeji (JP); Kazushi Torii, Himeji (JP); Shigeru Sakamoto, Himeji (JP); Taku Iwamura, Himeji (JP); Sayaka Machida, Himeji (JP)

(73) Assignee: Nippon Shokubai Co., Ltd., Osaka (JP)

( * ) Notice: Subject to any disclaimer, the term of this patent is extended or adjusted under 35 U.S.C. 154(b) by 518 days.

(21) Appl. No.: 10/593,706

(22) PCT Filed: Mar. 11, 2005

(86) PCT No.: PCT/JP2005/004858
§ 371 (c)(1),
(2), (4) Date: Sep. 21, 2006

(87) PCT Pub. No.: WO2005/097313
PCT Pub. Date: Oct. 20, 2005

(65) Prior Publication Data
US 2007/0207924 A1    Sep. 6, 2007

(30) Foreign Application Priority Data
Mar. 31, 2004 (JP) .................. 2004-105117

(51) Int. Cl.
*B01J 20/26* (2006.01)
(52) U.S. Cl. ..... 502/402; 502/400; 502/401; 526/238.3; 526/317.1; 526/318.2
(58) Field of Classification Search ............. 210/649, 210/655; 502/402, 400, 401; 525/329.1, 525/329.4, 330.1; 526/238.3, 317.1, 318.2
See application file for complete search history.

(56) References Cited

U.S. PATENT DOCUMENTS

| | | | |
|---|---|---|---|
| 3,935,099 A | 1/1976 | Weaver et al. | |
| 3,959,569 A | 5/1976 | Burkholder, Jr. | |

(Continued)

FOREIGN PATENT DOCUMENTS

CN   1466469 A   1/2004

(Continued)

OTHER PUBLICATIONS

Gourmand et al., Superabsorbent Polymers for Cable Application, Nonwovens World, Oct.-Nov. 2000, pp. 73-83.

*Primary Examiner* — Jerry Lorengo
*Assistant Examiner* — Pritesh Darji
(74) *Attorney, Agent, or Firm* — Roylance, Abrams, Berdo & Goodman, L.L.P.

(57) ABSTRACT

An object of the present invention is to provide an aqueous-liquid-absorbing agent which comprises water-absorbent resin particles as essential components and is suitable for uses in sanitary materials. As a means of achieving this object, an aqueous-liquid-absorbing agent according to the present invention is an aqueous-liquid-absorbing agent comprising water-absorbent resin particles as essential components, wherein the water-absorbent resin particles are obtained by a process including the step of polymerizing a water-soluble ethylenically unsaturated monomer and have a crosslinked structure in their inside; with the aqueous-liquid-absorbing agent exhibiting an absorption rate (FSR) of not less than 0.2 g/g/s, a water absorption capacity (CRC) of 5 to 25 g/g, a saline flow conductivity (SFC) of not less than $400 \times 10^{-7}$ $cm^3 \cdot s/g$, and a wet porosity of not less than 20%.

4 Claims, 4 Drawing Sheets

U.S. PATENT DOCUMENTS

| | | | |
|---|---|---|---|
| 4,076,663 A | 2/1978 | Masuda et al. | |
| 4,093,776 A | 6/1978 | Aoki et al. | |
| 4,124,748 A | 11/1978 | Fujimoto et al. | |
| 4,286,082 A | 8/1981 | Tsubakimoto et al. | |
| 4,367,323 A | 1/1983 | Kitamura et al. | |
| 4,389,513 A | 6/1983 | Miyazaki | |
| 4,446,261 A | 5/1984 | Yamasaki et al. | |
| 4,625,001 A | 11/1986 | Tsubakimoto et al. | |
| 4,654,039 A | 3/1987 | Brandt et al. | |
| 4,683,274 A | 7/1987 | Nakamura et al. | |
| 4,690,996 A | 9/1987 | Shih et al. | |
| 4,721,647 A | 1/1988 | Nakanishi et al. | |
| 4,734,478 A | 3/1988 | Tsubakimoto et al. | |
| RE32,649 E | 4/1988 | Brandt et al. | |
| 4,738,867 A | 4/1988 | Itoh et al. | |
| 4,748,076 A | 5/1988 | Saotome | |
| 4,769,427 A | 9/1988 | Nowakowsky et al. | |
| 4,873,299 A | 10/1989 | Nowakowsky et al. | |
| 4,920,202 A | 4/1990 | Irie et al. | |
| 4,950,692 A | 8/1990 | Lewis et al. | |
| 4,973,632 A | 11/1990 | Nagasuna et al. | |
| 4,985,518 A | 1/1991 | Alexander et al. | |
| 5,061,259 A | 10/1991 | Goldman et al. | |
| 5,124,416 A | 6/1992 | Haruna et al. | |
| 5,140,076 A | 8/1992 | Hatsuda et al. | |
| 5,145,906 A | 9/1992 | Chambers et al. | |
| 5,147,343 A | 9/1992 | Kellenberger | |
| 5,149,335 A | 9/1992 | Kellenberger et al. | |
| 5,244,735 A | 9/1993 | Kimura et al. | |
| 5,250,640 A | 10/1993 | Irie et al. | |
| 5,264,495 A | 11/1993 | Irie et al. | |
| 5,275,773 A * | 1/1994 | Irie et al. | 264/141 |
| 5,369,148 A | 11/1994 | Takahashi et al. | |
| 5,380,808 A | 1/1995 | Sumiya et al. | |
| 5,419,956 A | 5/1995 | Roe | |
| 5,453,323 A | 9/1995 | Chambers et al. | |
| 5,462,972 A | 10/1995 | Smith et al. | |
| 5,478,879 A | 12/1995 | Kajikawa et al. | |
| 5,562,646 A * | 10/1996 | Goldman et al. | 604/368 |
| 5,599,335 A | 2/1997 | Goldman et al. | |
| 5,601,542 A | 2/1997 | Melius et al. | |
| 5,669,894 A | 9/1997 | Goldman et al. | |
| 5,684,106 A | 11/1997 | Johnson et al. | |
| 5,712,316 A | 1/1998 | Dahmen et al. | |
| 5,760,080 A | 6/1998 | Wada et al. | |
| 5,797,893 A | 8/1998 | Wada et al. | |
| 5,849,405 A | 12/1998 | Wang et al. | |
| 5,851,672 A | 12/1998 | Wang et al. | |
| 5,866,678 A | 2/1999 | Kajikawa et al. | |
| 5,985,944 A | 11/1999 | Ishizaki et al. | |
| 5,994,440 A | 11/1999 | Staples et al. | |
| 6,011,196 A | 1/2000 | Wang et al. | |
| 6,071,976 A | 6/2000 | Dairoku et al. | |
| 6,087,002 A | 7/2000 | Kimura et al. | |
| 6,124,391 A | 9/2000 | Sun et al. | |
| 6,127,454 A | 10/2000 | Wada et al. | |
| 6,140,395 A * | 10/2000 | Hatsuda et al. | 523/319 |
| 6,150,582 A | 11/2000 | Wada et al. | |
| RE37,021 E | 1/2001 | Aida | |
| 6,174,978 B1 | 1/2001 | Hatsuda et al. | |
| 6,184,433 B1 | 2/2001 | Harada et al. | |
| 6,187,872 B1 | 2/2001 | Yanase et al. | |
| 6,194,531 B1 | 2/2001 | Hatsuda et al. | |
| 6,228,930 B1 | 5/2001 | Dairoku et al. | |
| 6,241,928 B1 | 6/2001 | Hatsuda et al. | |
| 6,254,990 B1 | 7/2001 | Ishizaki et al. | |
| 6,297,335 B1 | 10/2001 | Funk et al. | |
| 6,300,275 B1 | 10/2001 | Weir | |
| 6,414,214 B1 * | 7/2002 | Engelhardt et al. | 604/368 |
| 6,444,744 B1 | 9/2002 | Fujimaru et al. | |
| 6,562,879 B1 * | 5/2003 | Hatsuda et al. | 521/56 |
| 2002/0007170 A1 | 1/2002 | Wada et al. | |
| 2002/0120074 A1 | 8/2002 | Wada et al. | |
| 2002/0128618 A1 | 9/2002 | Frenz et al. | |
| 2002/0165288 A1 | 11/2002 | Frenz et al. | |
| 2004/0048955 A1 | 3/2004 | Wada et al. | |
| 2005/0118423 A1 | 6/2005 | Adachi et al. | |

FOREIGN PATENT DOCUMENTS

| | | |
|---|---|---|
| EP | 0 456 136 | 11/1991 |
| EP | 0 532 002 | 3/1993 |
| EP | 0 629 411 | 12/1994 |
| EP | 0 668 080 | 8/1995 |
| EP | 0 844 270 | 5/1998 |
| EP | 1 178 059 | 2/2002 |
| EP | 1178059 A2 * | 2/2002 |
| EP | 1 352 927 | 10/2003 |
| GB | 2 267 094 | 11/1993 |
| JP | 8-337726 | 12/1996 |
| JP | 9-124879 | 5/1997 |
| JP | 2000-63527 | 2/2000 |
| JP | 2000-501979 | 2/2000 |
| JP | 2000-143722 | 5/2000 |
| JP | 2001-523289 | 11/2001 |
| JP | 2002-514934 | 5/2002 |
| JP | 2002-523526 | 7/2002 |
| JP | 2002-542364 | 12/2002 |
| JP | 2003-246812 | 9/2003 |
| JP | 2001-523733 | 11/2007 |
| WO | WO 95/26209 | 10/1995 |
| WO | WO 99/25393 | 5/1999 |
| WO | WO 00/63295 | 10/2000 |
| WO | WO 02/20068 A1 | 3/2002 |
| WO | WO 03/004670 * | 5/2003 |
| WO | WO 2005/010102 | 2/2005 |

* cited by examiner

_US 7,981,833 B2_

AQUEOUS-LIQUID-ABSORBING AGENT AND ITS PRODUCTION PROCESS

TECHNICAL FIELD

The present invention relates to an aqueous-liquid-absorbing agent and its production process. More specifically, the present invention relates to an aqueous-liquid-absorbing agent and its production process, wherein the aqueous-liquid-absorbing agent is used favorably for sanitary materials such as diapers.

BACKGROUND ART

Hitherto, water-absorbent resins have been large in absorption rate, absorption amount, and retainability for aqueous liquids and therefore, for uses of the sanitary materials such as diapers, utilized as components of absorbent structures of the sanitary materials by, if necessary, being mixed with fibrous materials.

In recent years, the ratios of the water-absorbent resins in the absorbent structures tend to increase with the increasing needs of the thinning of the sanitary materials such as diapers (e.g. refer to patent document 1 below).

[Patent Document 1] pamphlet of WO 95/26209

As the ratios of the water-absorbent resins in the absorbent structures increase, it has become increasingly necessary to develop, as a future water-absorbent resin, an aqueous-liquid-absorbing agent which combines performances of conventional water-absorbent resins and performances provided by the fibrous materials in conventional absorbent structures.

Examples of the performances demanded to such an aqueous-liquid-absorbing agent include: a performance of rapidly absorbing an aqueous liquid to which the performances of the fibrous materials greatly contribute; a performance of diffusing the aqueous liquid after having absorbed it; and a performance of being capable of retaining the aqueous liquid after having absorbed it; to say nothing of performances of absorbing and retaining the aqueous liquid without load and under load.

DISCLOSURE OF THE INVENTION

Object of the Invention

An object of the present invention is to provide an aqueous-liquid-absorbing agent and its production process, wherein the aqueous-liquid-absorbing agent has the above performances and is suitable for the uses of the sanitary materials and for other uses.

Summary of the Invention

The present inventors have decided to diligently study to solve the above problems. Then, the present inventors have become sure from their past experiences that the aqueous-liquid-absorbing agent to solve the above problems must comprise water-absorbent resin particles as essential components, wherein the water-absorbent resin particles are obtained by a process including the step of polymerizing a water-soluble ethylenically unsaturated monomer and have a crosslinked structure in their inside. Its reason is that the water-absorbent resin particles are inherently excellent in the performances of absorbing and retaining the aqueous liquid, but that the fibrous materials almost lack these performances.

Thus, the present inventors have subsequently made a series of various studies about performance design of the aqueous-liquid-absorbing agent on the assumption of comprising the above water-absorbent resin particles as essential components. As a result, the present inventors have found that the aqueous-liquid-absorbing agent comprising the above water-absorbent resin particles as essential components needs to exhibit a water absorption capacity (CRC) of 5 to 25 g/g and an absorption rate (FSR) of not less than 0.2 g/g/s. In addition, the present inventors have further found that, in order for the above aqueous-liquid-absorbing agent to further diffuse the aqueous liquid rapidly in vertical and horizontal directions after having absorbed it, the above aqueous-liquid-absorbing agent needs to exhibit a saline flow conductivity (SFC) of not less than $400 \times 10^{-7}$ cm$^3 \cdot$s/g, and that, on the other hand, in order for the above aqueous-liquid-absorbing agent to have the aqueous-liquid-retaining ability capable of further retaining the aqueous liquid after having absorbed it, the above aqueous-liquid-absorbing agent needs to exhibit a wet porosity of not less than 20%. Then, the present inventors have completed the present invention by also conceiving, preparing, and carrying out a constitution and production process for materialization of the above and then confirming their functions and effects.

That is to say, an aqueous-liquid-absorbing agent according to the present invention is an aqueous-liquid-absorbing agent comprising water-absorbent resin particles as essential components, wherein the water-absorbent resin particles are obtained by a process including the step of polymerizing a water-soluble ethylenically unsaturated monomer and have a crosslinked structure in their inside; with the aqueous-liquid-absorbing agent being characterized by exhibiting an absorption rate (FSR) of not less than 0.2 g/g/s, a water absorption capacity (CRC) of 5 to 25 g/g, a saline flow conductivity (SFC) of not less than $400 \times 10^{-7}$ cm$^3 \cdot$s/g, and a wet porosity of not less than 20%.

As to the above aqueous-liquid-absorbing agent according to the present invention:

it is possible that the aqueous-liquid-absorbing agent is a particulate shape, and that not less than 90 weight % thereof is in the form of particles having particle diameters in the range of 150 to 600 μm;

it is possible that at least a portion of the water-absorbent resin particles are agglomerate particles;

it is possible that the water-absorbent resin particles are surface-crosslinked ones; and it is possible that the aqueous-liquid-absorbing agent further comprises a liquid-permeability-enhancing agent.

In addition, a process according to the present invention for production of an aqueous-liquid-absorbing agent is a process for production of an aqueous-liquid-absorbing agent including water-absorbent resin particles as essential components, which process comprises the steps of: preparing an aqueous monomer solution including a water-soluble ethylenically unsaturated monomer and an internal-crosslinking agent of not less than 0.2 mol % in ratio to the monomer; and then polymerizing and internal-crosslinking the water-soluble ethylenically unsaturated monomer in the aqueous monomer solution to thereby form a hydrogel; and then extruding the hydrogel from a perforated structure having perforation diameters in the range of 0.3 to 6.4 mm to thereby pulverize the hydrogel to thus obtain pulverized gel particles; and then drying the pulverized gel particles to thereby obtain the water-absorbent resin particles.

As to the above process according to the present invention for production of an aqueous-liquid-absorbing agent:

it is possible that at least a portion of the pulverized gel particles are agglomerates;

it is possible that the above process for production of an aqueous-liquid-absorbing agent further comprises the step of surface-crosslinking the water-absorbent resin particles;

it is possible that the above process for production of an aqueous-liquid-absorbing agent further comprises the step of subjecting the water-absorbent resin particles to treatment for liquid permeability enhancement;

it is possible that the treatment for liquid permeability enhancement is carried out by adding a liquid-permeability-enhancing agent;

it is possible that the liquid-permeability-enhancing agent is at least one member selected from among polyvalent metal compounds, polycationic compounds, and inorganic fine particles; and it is possible that the aqueous monomer solution has a monomer concentration of neither lower than 35 weight % nor higher than a saturated concentration.

Effects of the Invention

In the present invention, for example, if the absorbent structures in the sanitary materials such as diapers are constituted by containing the aqueous-liquid-absorbing agent according to the present invention, then, in the uses of the sanitary materials and in other uses, the great exercise can be done such that the sanitary materials can be thinned, because: the aqueous liquid can rapidly be absorbed, and also, the aqueous liquid can be diffused through a still wider range, and further, the aqueous liquid can be retained in an amount of not smaller than is absorbed by the aqueous-liquid-absorbing agent.

Figure 1:
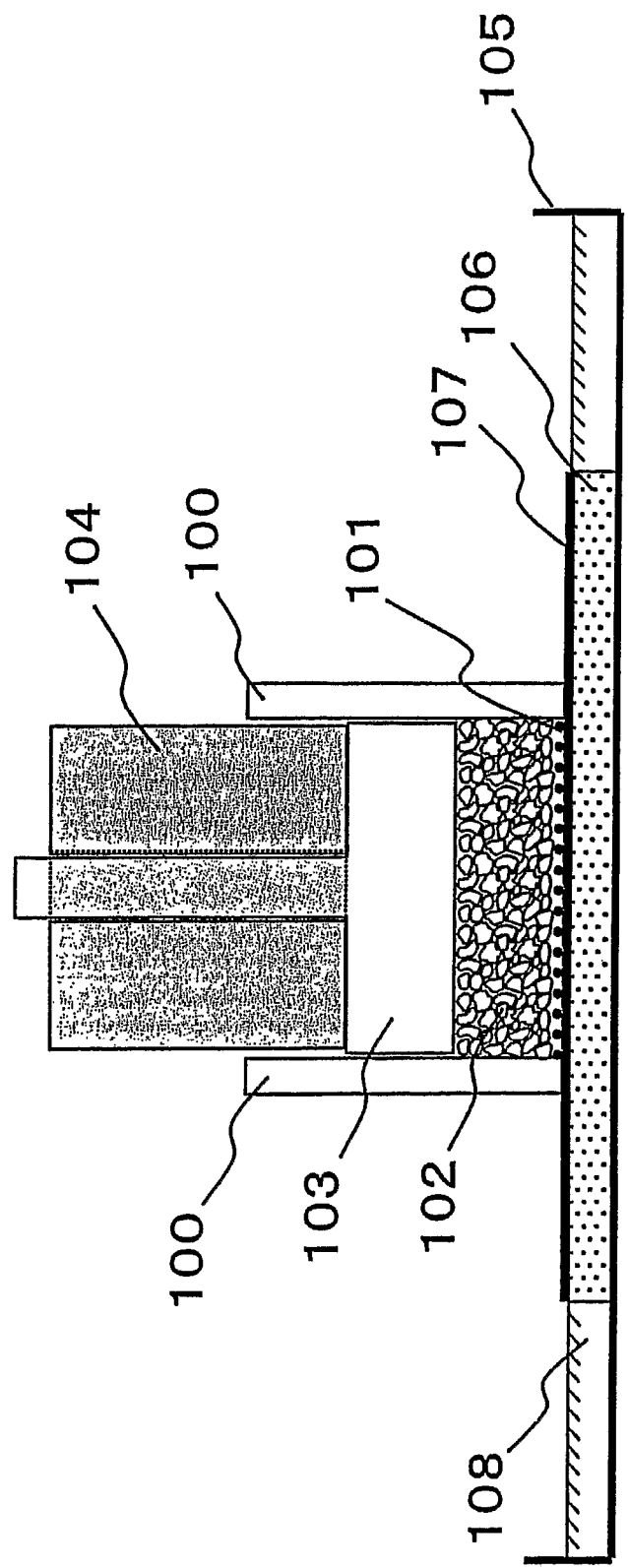
FIG. 1 is a schematic sectional view of a measurement apparatus as used for measuring the AAP.

| [Explanation of the Symbols] | |
|---|---|
| 100: | Plastic supporting cylinder |
| 101: | Stainless metal gauze of 400 meshes |
| 102: | Swollen gel (aqueous-liquid-absorbing agent) |
| 103: | Piston |
| 104: | Load (weight) |
| 105: | Petri dish |
| 106: | Glass filter plate |
| 107: | Filter paper |
| 108: | Physiological saline solution |
| 200: | End-open glass tube and rubber stopper part |
| 201: | Rubber stopper part |
| 202: | Storage tank |
| 203: | Laboratory jack |
| 204: | Glass tube having a valve |
| 205: | Valve |
| 206: | SFC instrument |
| 207: | Collection tank |
| 208: | Balance |
| 209: | Support |
| 210: | Flexible tube |
| 211: | Weight |
| 212: | Piston |
| 213: | Cover |
| 214: | Cylinder |

| [Explanation of the Symbols] | |
|---|---|
| 215: | Piston head |
| 216: | Wire mesh of 400 meshes |
| 217: | Swollen aqueous-liquid-absorbing agent |

DETAILED DESCRIPTION OF THE INVENTION

Hereinafter, detailed descriptions are given about the present invention. However, the scope of the present invention is not bound to these descriptions. And other than the following illustrations can also be carried out in the form of appropriate modifications of the following illustrations within the scope not departing from the spirit of the present invention.

The water-absorbent resin particles, usable in the present invention, are particles of a water-insoluble, water-swellable, and hydrogel-formable polymer which is obtained by a process including the step of polymerizing a water-soluble ethylenically unsaturated monomer and has a crosslinked structure in its inside. The term "water-swellable" means exhibiting a water absorption capacity of favorably not less than 5 times. The term "water-insoluble" means having an extractable component content of favorably not higher than 50 weight %, more favorably not higher than 20 weight %, still more favorably in the below-mentioned range. In addition, the water absorption capacity is not less than 5 times at least for a physiological saline solution. Examples of the shape of the particles include: a spherical shape; a shape of an agglomerate of spheres; a shape like a flattened sphere; an irregularly pulverized shape; a shape of an agglomerate of irregularly pulverized materials; and a foamed shape having pores. Incidentally, in the present invention, the water-absorbent resin particles may be referred to simply as water-absorbent resin.

The aqueous-liquid-absorbing agent in the present invention refers to an agent for absorption and solidification of aqueous liquids, which agent comprises the water-absorbent resin as the main component and, if necessary, further comprises a small or very small amount of additive or water. The water-absorbent resin content is favorably in the range of 70 to 100 weight %, more favorably 80 to 100 weight %, still more favorably 90 to 100 weight %, relative to the entire aqueous-liquid-absorbing agent. As the small or very small amount of component, usually, water is contained as its main or essential component, and further such as the below-mentioned liquid-permeability-enhancing agent or additive is used.

Incidentally, the aqueous liquid is not limited to water, and examples of the aqueous liquid include: urine; blood; excrement; waste liquids; moisture; steam; ice; mixtures of water and organic or inorganic solvents; rainwater; and underground water. The aqueous liquid is free of especial limitation if it contains water. However, favorably, the aqueous-liquid-absorbing agent is used as an agent for absorption and solidification of urine, particularly, human urine.

Specific examples of the water-insoluble, water-swellable, and hydrogel-formable polymer or its particles include: partially-neutralized and crosslinked polymers of poly(acrylic acids) (e.g. U.S. Pat. Nos. 4,625,001, 4,654,039, 5,250,640, 5,275,773, EP 0456136); crosslinked and partially-neutralized graft polymers of starch-acrylic acid (U.S. Pat. No. 4,076,663); copolymers of isobutylene-maleic acid (U.S. Pat. No. 4,389,513); saponified copolymers of vinyl acetateacrylic acid (U.S. Pat. No. 4,124,748); hydrolyzed (co)polymers of acrylamide (U.S. Pat. No. 3,959,569); and hydrolyzed polymers of acrylonitrile (U.S. Pat. No. 3,935,099).

The process according to the present invention for production of the aqueous-liquid-absorbing agent is free of especial limitation if the resultant aqueous-liquid-absorbing agent satisfies the physical properties according to the present invention. However, for example, the aqueous-liquid-absorbing agent can be obtained by the following <process 1> to <process 3>.

<Process 1>:

A process including the steps of: crosslink-polymerizing an aqueous unsaturated monomer solution in the presence of a large amount (in a specific range) of crosslinking agent; and then extruding the resultant hydrogel from a perforated structure having specific perforation diameters to thereby pulverize the hydrogel; and then drying the pulverized gel.

<Process 2>:

A process including the steps of: crosslink-polymerizing an aqueous unsaturated monomer solution in the presence of a large amount (in a specific range) of crosslinking agent and in the presence of a foaming agent; and then pulverizing the resultant hydrogel; and then drying the pulverized gel.

<Process 3>:

A process including the steps of: crosslink-polymerizing an aqueous unsaturated monomer solution in the presence of a large amount (in a specific range) of crosslinking agent; and then pulverizing the resultant hydrogel; and then drying the pulverized gel; and then agglomerating it.

In these processes 1 to 3, favorably, the pulverized gel is in the form of agglomerate particles, and also favorably, the surface-crosslinking or the addition of the liquid-permeability-enhancing agent is carried out after the drying, and also favorably, the polymerization is carried out in the aqueous solution having a specific high concentration.

Hereinafter, descriptions are given about the process according to the present invention for production of the aqueous-liquid-absorbing agent (processes 1 to 3, particularly, process 1) and further about the aqueous-liquid-absorbing agent according to the present invention in order.

Examples of the water-soluble ethylenically unsaturated monomer include carboxyl-group-containing water-soluble monomers, sulfonic-acid-group-containing water-soluble monomers, and amide-group-containing water-soluble monomers. Favorably, the carboxyl-group-containing water-soluble monomers are used and, particularly favorably, acrylic acid and/or its salt is used.

The water-absorbent resin particles, usable in the present invention, are favorably water-absorbent resin particles including a crosslinked poly(acrylic acid) (salt) polymer obtained by a process including the step of polymerizing a monomer including acrylic acid and/or its salt.

The crosslinked poly(acrylic acid) (salt) polymer in the present invention is a polymer which is obtained by a process including the step of polymerizing a monomer including acrylic acid and/or its salt in an amount of favorably 50 to 100 mol %, more favorably 70 to 100 mol %, still more favorably 90 to 100 mol %, and has a crosslinked structure in its inside. In addition, favorably 25 to 100 mol %, more favorably 50 to 99 mol %, still more favorably 55 to 80 mol %, of acid groups in the polymer are neutralized. As examples of the salt, there can be cited at least one of such as: alkaline metal (e.g. sodium, potassium, lithium) salts; ammonium salts; and amine salts. The neutralization of the acid group for forming the salt may be carried out in a monomer state before the polymerization, or may be carried out in a polymer state on the way of or after the polymerization, or may be carried out both in these states.

The crosslinked poly(acrylic acid) (salt) polymer, which is favorably used as the water-absorbent resin particles in the present invention, may, if necessary, be a copolymer obtained by copolymerizing another monomer jointly with the water-soluble ethylenically unsaturated monomer (acrylic acid and/or its salt) used as the main component.

Specific examples of the above other monomer include: anionic unsaturated monomers (e.g. methacrylic acid, maleic acid, vinylsulfonic acid, styrenesulfonic acid, 2-(meth)acrylamido-2-methylpropanesulfonic acid, 2-(meth)acryloylethanesulfonic acid, 2-(meth)acryloylpropanesulfonic acid) and their salts; nonionic-hydrophilic-group-containing unsaturated monomers (e.g. acrylamide, methacrylamide, N-ethyl(meth)acrylamide, N-n-propyl(meth)acrylamide, N-isopropyl(meth)acrylamide, N,N-dimethyl(meth)acrylamide, 2-hydroxyethyl (meth)acrylate, 2-hydroxypropyl (meth)acrylate, methoxypolyethylene glycol (meth)acrylate, polyethylene glycol mono(meth)acrylate, vinylpyridine, N-vinylpyrrolidone, N-acryloylpiperidine, N-acryloylpyrrolidine, N-vinylacetamide); and cationic unsaturated monomers (e.g. N,N-dimethylaminoethyl(meth)acrylate, N,N-diethylaminoethyl(meth)acrylate, N,N-dimethylaminopropyl (meth)acrylate, N,N-dimethylaminopropyl(meth) acrylamide, and their quaternary salts). The amount of these monomers used as monomers other than acrylic acid and/or its salt is favorably in the range of 0 to 30 mol %, more favorably 0 to 10 mol %, of the entire monomers.

The water-absorbent resin particles, usable in the present invention, have a crosslinked structure in their inside.

As to methods for introducing the internal crosslinked structure into the water-absorbent resin particles as used in the present invention, examples thereof include: a method in which the introduction is carried out by self-crosslinking without any crosslinking agent; and a method in which the introduction is carried out by copolymerization or reaction with an internal-crosslinking agent having at least two polymerizable unsaturated groups and/or at least two reactive groups per molecule.

Specific examples of these internal-crosslinking agents include: copolymerizable crosslinking agents such as N,N'-methylenebis(meth)acrylamide, (poly)ethylene glycol di(meth)acrylate, (poly)propylene glycol di(meth)acrylate, trimethylolpropane tri(meth)acrylate, trimethylolpropane di(meth)acrylate, glycerol tri(meth)acrylate, glycerol acrylate methacrylate, ethylene-oxide-modified trimethylolpropane tri(meth)acrylate, pentaerythritol tetra(meth)acrylate, dipentaerythritol hexa(meth)acrylate, triallyl cyanurate, triallyl isocyanurate, triallyl phosphate, triallylamine, tetraallyloxyethane, pentaerythritol triallyl ether, and poly(meth)allyloxyalkanes. In addition, as examples of internal-crosslinking agents having a copolymerizable group and a covalent-bondable group, there can be cited such as (poly)ethylene glycol diglycidyl ether, glycerol diglycidyl ether, ethylenediamine, polyethylenimine, glycidyl(meth)acrylate, hydroxyethyl (meth)acrylate, and hydroxypropyl(meth)acrylate.

In addition, besides, as examples of internal-crosslinking agents having at least two covalent-bondable or ionic-bondable groups, there can also be cited such as: polyhydric alcohol compounds (e.g. ethylene glycol, diethylene glycol, propylene glycol, triethylene glycol, tetraethylene glycol, polyethylene glycol, 1,3-propanediol, dipropylene glycol, 2,2,4-trimethyl-1,3-pentanediol, polypropylene glycol, glycerol, polyglycerol, 2-butene-1,4-diol, 1,3-butanediol, 1,4-butanediol, 1,5-pentanediol, 1,6-hexanediol, 1,2-cyclohexanedimethanol, 1,2-cyclohexanol, trimethylolpropane, diethanolamine, triethanolamine, polyoxypropylene, oxyethylene-oxypropylene block copolymers, pentaerythritol, and sorbitol); and polyvalent metallic compounds (e.g. hydroxides and chlorides of such as zinc, calcium, magnesium, aluminum, iron and zirconium).

These internal-crosslinking agents may be used either alone respectively or in combinations with each other. Above all, from the viewpoint of such as water absorption properties of the obtained water-absorbent resin, it is favorable that a compound having at least two polymerizable unsaturated groups is essentially used as the internal-crosslinking agent, and it is more favorable that the internal-crosslinking agent having a copolymerizable group and a covalent-bondable group or the internal-crosslinking agent having at least two covalent-bondable or ionic-bondable groups, particularly, the polyhydric alcohol, is used jointly therewith.

The water-absorbent resin particles, usable in the present invention, are those of a high-crosslinked polymer favorably for sufficiently exercising the effects of the present invention. The amount of the internal-crosslinking agent as used is favorably in the range of 0.005 to 3 mol %, more favorably 0.01 to 2 mol %, still more favorably 0.2 to 2 mol %, particularly favorably 0.4 to 1.5 mol %, relative to the entire monomers (water-soluble ethylenically unsaturated monomers excluding the internal-crosslinking agents). Particularly, if the internal-crosslinking agent is used in an amount of not smaller than 0.2 mol % relative to the entire monomers (water-soluble ethylenically unsaturated monomers excluding the internal-crosslinking agents), then there are advantages in that the effects of the present invention can still more be exercised.

In addition, in the case where (i) the internal-crosslinking agent having at least two polymerizable unsaturated groups and (ii) the internal-crosslinking agent having a copolymerizable group and a covalent-bondable group or internal-crosslinking agent having covalent-bondable or ionic-bondable groups are used jointly with each other as the internal-crosslinking agents in the present invention, the amounts of these internal-crosslinking agents as used are in the following ranges relative to the entire monomers (water-soluble ethylenically unsaturated monomers excluding the internal-crosslinking agents): favorably (i) 0.005 to 3 mol % and (ii) 0 to 2.995 mol %; more favorably (i) 0.01 to 2 mol % and (ii) 0 to 1.99 mol %; particularly favorably (i) 0.2 to 2 mol % and (ii) 0 to 1.9 mol %.

When the polymerization is carried out, there can be added such as: hydrophilic polymers (e.g. starch, cellulose, starch derivatives, cellulose derivatives, polyvinyl alcohol, poly(acrylic acid) (salts), and crosslinked poly(acrylic acid) (salts)) in an amount of 0 to 30 weight % relative to the entire monomers (water-soluble ethylenically unsaturated monomers excluding the internal-crosslinking agents); and chain transfer agents (e.g. hypophosphorous acid (salts)) in an amount of 0 to 1 weight % relative to the entire monomers (water-soluble ethylenically unsaturated monomers excluding the internal-crosslinking agents).

When the above monomer including the water-soluble ethylenically unsaturated monomer (favorably, acrylic acid and/or its salt) as the major component is polymerized to obtain the water-absorbent resin particles usable in the present invention, then bulk polymerization, reversed-phase suspension polymerization, or precipitation polymerization may be carried out, but, from the viewpoint of the performance or the easiness in controlling the polymerization, it is favorable to carry out aqueous solution polymerization in which the monomer is used in the form of an aqueous solution. Such polymerization methods are disclosed in such as U.S. Pat. Nos. 4,625,001, 4,769,427, 4,873,299, 4,093,776, 4,367,323, 4,446,261, 4,683,274, 4,690,996, 4,721,647, 4,738,867, 4,748,076, and EP 1178059.

When the polymerization is carried out, there may, for example, be used the following: radical polymerization initiators such as potassium persulfate, ammonium persulfate, sodium persulfate, t-butyl hydroperoxide, hydrogen peroxide, and 2,2'-azobis(2-amidinopropane) dihydrochloride; and active energy rays such as ultraviolet rays and electron beams. In addition, in the case where the radical polymerization initiators are used, they may be used jointly with reducing agents such as sodium sulfite, sodium hydrogensulfite, ferrous sulfate, and L-ascorbic acid to carry out redox polymerization. The amount of these polymerization initiators as used is favorably in the range of 0.001 to 2 mol %, more favorably 0.01 to 0.5 mol %, relative to the entire monomers.

When the polymerization is carried out, the monomer may be used in a slurry state exceeding a saturated concentration. However, the aqueous monomer solution as used has a monomer concentration of favorably neither lower than 35 weight % nor higher than the saturated concentration, more favorably neither lower than 37 weight % nor higher than the saturated concentration. The temperature of the aqueous monomer solution is favorably in the range of 0 to 100° C., more favorably 10 to 95° C. Incidentally, the saturated concentration is specified by the temperature of the aqueous monomer solution.

The water-absorbent resin, obtained by the above polymerization, is a hydrogel, and its shape is generally such as irregularly pulverized shape, spherical shape, fibrous shape, bar shape, approximately spherical shape, or flat shape.

The resultant hydrogel may be dried as it is. However, favorably, the hydrogel is extruded from a perforated structure having perforation diameters in the range of 0.3 to 6.4 mm to thus pulverize the hydrogel to thereby form it into pulverized gel particles. By such favorable extrusion of the high-crosslinked (high-internal-crosslinked) hydrogel from the perforated structure having the specific perforation diameters to thus pulverize the hydrogel, it becomes possible to form it into the pulverized gel particles which can sufficiently exercise the effects of the present invention. The shape of the perforations is such as a circular, quadrangular (e.g. square, rectangular), triangular, or hexagonal shape and is not especially limited. However, favorably, the hydrogel is extruded from circular perforations. Incidentally, the aforementioned perforation diameters are defined as the diameters given in the case of converting the outer peripheries of the mesh opening portions into those of the circles.

The perforation diameters of the perforated structure for carrying out the extrusion pulverization in order to obtain the pulverized gel particles are more favorably in the range of 0.5 to 4.0 mm, still more favorably 0.5 to 3.0 mm.

In the case where the perforation diameters of the perforated structure are smaller than 0.3 mm, there is a possibility that the gel may become strings, or that the gel cannot be extruded. In the case where the perforation diameters of the perforated structure are larger than 6.4 mm, there is a possibility that the effects of the present invention cannot be exercised.

Examples of the apparatus for carrying out the extrusion pulverization in order to obtain the pulverized gel particles include such as extrudes the hydrogel polymer from a perforated plate to thereby pulverize the hydrogel polymer. As the extrusion mechanism, there is used the mechanism of the type which can press-feed the hydrogel polymer from its supply inlet to the perforated plate, such as screw type or rotary roll type. The screw type extruder may be a single or multiple screw type and may be a type which is used usually for extrusion molding of edible meat, rubber, and plastic or used as a pulverizer. Examples thereof include meat choppers and Dome Gran.

It is favorable that at least a portion of the water-absorbent resin particles usable in the present invention are agglomerate particles. More favorably, these agglomerate particles are those which are obtained by a process including the step of agglomeration of particles having particle diameters of smaller than 150 μm. The process for achieving such a mode that at least a portion of the water-absorbent resin particles are agglomerate particles is not especially limited and will do if hitherto publicly known agglomeration processes are applied thereto. Examples of such applicable processes include processes in which: warm water and a fine powder of water-absorbent resin particles are mixed together and then dried (U.S. Pat. No. 6,228,930); a fine powder of water-absorbent resin particles is mixed with an aqueous monomer solution, and then the resultant mixture is polymerized (U.S. Pat. No. 5,264,495); water is added to a fine powder of water-absorbent resin particles, and then the resultant mixture is agglomerated under not less than a specific face pressure (EP 0844270); a fine powder of water-absorbent resin particles is sufficiently wetted to thus form an amorphous gel, and then this gel is dried and pulverized (U.S. Pat. No. 4,950,692); and a fine powder of water-absorbent resin particles and a polymer gel are mixed together (U.S. Pat. No. 5,478,879).

In addition, it is favorable that at least a portion of the water-absorbent resin particles usable in the present invention are foamed particles. These foamed particles are favorably those which are obtained by a process characterized by including the step of polymerizing the monomer containing an azo initiator or a foaming agent (e.g. a carbonate) or polymerizing the monomer while it contains bubbles by causing it to bubble with an inert gas.

As a particularly favorable mode, the present inventors have found out that the agglomeration can be carried out at the same time as the gel pulverization if, as is aforementioned, the hydrogel (obtained by polymerizing the aqueous monomer solution which has the specific monomer concentration and contains the internal-crosslinking agent in the specific amount) is extruded under the specific conditions (namely, extruded from the perforated structure having perforation diameters in the range of 0.3 to 6.4 mm) to thus pulverize the hydrogel. In this process, in order to carry out the agglomeration at the same time as the pulverization, it is permitted to add such as: water; the polyhydric alcohols aforementioned as examples of the internal-crosslinking agent; mixed liquid of water and the polyhydric alcohols; solutions prepared by dissolving, into water, the polyvalent metal compounds aforementioned as examples of the internal-crosslinking agent; or their vapors. In other words, it is favorable that at least a portion of the pulverized gel particles, obtained by extruding the hydrogel to thus pulverize the hydrogel, are agglomerates. Incidentally, the agglomerates refer to those which are in the form resultant from adhesion of finely pulverized gel particles to each other, that is, cohesion of those particles, or resultant from adhesion of smaller particles to one particle. As to the form of the agglomerates, it is also possible that a state where more than one particle are bonded together is confirmed with an optical microscope or electron microscope. Besides, in the case where the aqueous-liquid-absorbing agent is particulate, the form of the agglomerates can be confirmed also from the decrease of the bulk density due to the agglomeration.

In the present invention, the water-absorbent resin particles or the aqueous-liquid-absorbing agent favorably has a bulk density in the range of 0.40 to 0.67 g/ml, more favorably 0.45 to 0.65 g/ml, still more favorably 0.50 to 0.60 g/ml, and contains the agglomerate particles in such a range. In the case where the bulk density deviates from the above ranges or where no agglomerate particle is contained, there is a possibility that the effects of the present invention may be difficult to exercise. By obtaining such an aqueous-liquid-absorbing agent containing the agglomerate particles, it becomes easy to obtain the aqueous-liquid-absorbing agent excellent in the absorption rate, the water absorption capacity, the saline flow conductivity, and the wet porosity.

The hydrogel obtained by the polymerization is favorably dried after having favorably been processed by the above step of extruding the hydrogel from the perforated structure having perforation diameters in the range of 0.3 to 6.4 mm to thus pulverize the hydrogel to thereby obtain the pulverized gel particles. After this drying, favorably, further pulverization is carried out.

Although not especially limited, conditions for drying the hydrogel or the pulverized gel particles are favorably such that: the temperature is in the range of 120 to 250° C., and the duration is in the range of 10 to 180 minutes; and more favorably such that: the temperature is in the range of 150 to 200° C., and the duration is in the range of 30 to 120 minutes. In addition, it is also possible to apply a drying method as described in U.S. Pat. No. 4,920,202.

As a result of the drying, the hydrogel or the pulverized gel particles favorably have a solid content (defined as the ratio of the weight, as left by subtracting the drying loss on drying at 180° C. in 3 hours, to the weight before the drying) in the range of 70 to 99.8 weight %, more favorably 80 to 99.7 weight %, still more favorably 90 to 99.5 weight %. In the case where the solid content deviates from these ranges, it is difficult to achieve the enhancement of the physical properties of the water-absorbent resin by its surface treatment (crosslinking).

Conditions for pulverizing the hydrogel or the pulverized gel particles (favorably, after having dried it) are not especially limited. However, for example, hitherto known pulverizers (e.g. roll mills, hammer mills) are usable. The shape obtained by the pulverization is favorably an irregularly pulverized shape and, more favorably, particles of an agglomerated shape having a large surface area are partly contained.

The water-absorbent resin particles, usable in the present invention, are, for example, further processed by such as classification, whereby the weight-average particle diameter is favorably adjusted (regulated) in the range of 150 to 500 μm, more favorably 200 to 400 μm, still more favorably 250 to 380 μm. In addition, the logarithmic standard deviation (σζ) is favorably adjusted (regulated) in the range of 0.45 to 0.20, more favorably 0.35 to 0.22, still more favorably 0.30 to 0.25. By adjusting (regulating) the weight-average particle diameter and the logarithmic standard deviation (σζ) in this way as to the water-absorbent resin particles usable in the present invention, the effects of the present invention can still more be exercised.

In the present invention, in the case where the classification is carried out as the need arises, the sieve used in this classification needs to be selected with consideration given to the classification efficiency. For example, in the case where the water-absorbent resin particles or aqueous-liquid-absorbing agent which passes through a sieve of 150 μm in mesh opening size is removed by the classification operation, the particles of not larger than 150 μm in particle diameter are difficult to entirely remove, and it is therefore favorable that the type of the sieve to be used is selected appropriately for obtaining the water-absorbent resin particles or aqueous-liquid-absorbing agent having the objective particle diameters.

For still more exercising the effects of the present invention, it is favorable that the water-absorbent resin particles usable in the present invention include particles having particle diameters in the range of 150 to 600 μm in an amount of 90 to 100 weight %, more favorably 95 to 100 weight %, and also it is more favorable that the water-absorbent resin particles usable in the present invention include particles having particle diameters in the range of 150 to 500 μm in an amount of 90 to 100 weight %, particularly favorably 95 to 100 weight %. In the case where particles of smaller than 150 μm in particle diameter are included in a large amount, there is a possibility that the liquid permeability may be so poor as to result in failure to sufficiently exercise the effects of the present invention. In the case where particles of larger than 600 μm in particle diameter are included in a large amount, there is a possibility that, on the occasion of the practical use, for example, an unpleasant feeling may be given to human bodies during the contact therewith.

For still more exercising the effects of the present invention, it is favorable that the water-absorbent resin particles usable in the present invention are subjected to treatment for liquid permeability enhancement.

Although not especially limited, the treatment for liquid permeability enhancement is favorably carried out by adding a liquid-permeability-enhancing agent.

In the present invention, the treatment for liquid permeability enhancement may be carried out any time of before, simultaneously with, or after the below-mentioned surface treatment (crosslinking). However, for more exercising the effects of the present invention, it is favorable that the treatment for liquid permeability enhancement is carried out after the surface treatment (crosslinking) and separately therefrom.

Examples of the liquid-permeability-enhancing agent include: polyvalent metal compounds (e.g. aluminum sulfate, potassium alum, ammonium alum, sodium alum, (poly)aluminum chloride, and their hydrates); polycationic compounds (e.g. polyethylenimine, polyvinylamine, polyallylamine); and inorganic fine particles (e.g. silica, alumina, bentonite). These may be used either alone respectively or in combinations with each other. Above all, water-soluble polyvalent metal salts (e.g. aluminum sulfate, potassium alum) are favorable in point of enhancing the saline flow conductivity (SFC) and the wet porosity.

The liquid-permeability-enhancing agent is used in an amount of favorably 0.001 to 10 weight %, more favorably 0.01 to 5 weight %, relative to the water-absorbent resin particles.

The method for adding the liquid-permeability-enhancing agent is not especially limited. It may be dry-blend, or the liquid-permeability-enhancing agent may be added in the form of an aqueous solution, or the addition method may be carried out by heat-fusion.

More specifically, the dry-blend is a method in which the water-absorbent resin particles are uniformly mixed with the above liquid-permeability-enhancing agent (which is solid and powdery) (e.g. the polyvalent metal compound or inorganic fine particles) after having been dried and pulverized. If necessary, after this mixing, water or an aqueous polyhydric alcohol solution may further be added and mixed, and further, heating may be carried out. The addition in the form of an aqueous solution is a method in which an aqueous solution of such as the polyvalent metal compound or polycationic compound is added to the water-absorbent resin particles to mix them together. The higher the concentration of the polyvalent metal compound or polycationic compound is, the more favorable it is. In addition, after the mixing, heating may be carried out, if necessary. The heat-fusion is a method in which: the heating is carried out at the same time as or after mixing the polyvalent metal hydrate (e.g. aluminum sulfate, potassium alum, ammonium alum, sodium alum) and the water-absorbent resin particles together; or the water-absorbent resin particles having been preheated are mixed with the polyvalent metal compound; whereby the polyvalent metal hydrate is fused and then made to adhere to the water-absorbent resin particles. If necessary, water may be added before the heating.

For still more exercising the effects of the present invention, it is favorable that the water-absorbent resin particles usable in the present invention are surface-crosslinked ones.

The step of surface-crosslinking the water-absorbent resin particles is favorably carried out in at least one stage selected from among before, simultaneously with, and after the step of subjecting the water-absorbent resin particles to the aforementioned treatment for liquid permeability enhancement.

Examples of the surface-crosslinking agent usable for the surface-crosslinking treatment include: organic surface-crosslinking agents which have at least two functional groups reactable with a functional group (particularly, a carboxyl group) of the water-absorbent resin particles; polyvalent metal compounds; and polycations. Examples thereof include: polyhydric alcohol compounds (e.g. ethylene glycol, diethylene glycol, propylene glycol, triethylene glycol, tetraethylene glycol, polyethylene glycol, 1,3-propanediol, dipropylene glycol, 2,2,4-trimethyl-1,3-pentanediol, polypropylene glycol, glycerol, polyglycerol, 2-butene-1,4-diol, 1,3-butanediol, 1,4-butanediol, 1,5-pentanediol, 1,6-hexanediol, 1,2-cyclohexanedimethanol, 1,2-cyclohexanol, trimethylolpropane, diethanolamine, triethanolamine, polyoxypropylene, oxyethylene-oxypropylene block copolymers, pentaerythritol, and sorbitol); epoxy compounds (e.g. ethylene glycol diglycidyl ether, polyethylene glycol diglycidyl ether, glycerol polyglycidyl ether, diglycerol polyglycidyl ether, polyglycerol polyglycidyl ether, propylene glycol diglycidyl ether, polypropylene glycol diglycidyl ether, and glycidol); polyamine compounds (e.g. ethylenediamine, diethylenetriamine, triethylenetetramine, tetraethylenepentamine, pentaethylenehexamine, and polyethylenimine) and their inorganic or organic salts (e.g. azetidinium salts); polyisocyanate compounds (e.g. 2,4-tolylene diisocyanate and hexamethylene diisocyanate); polyoxazoline compounds (e.g. 1,2-ethylenebisoxazoline); carbonic acid derivatives (e.g. urea, thiourea, guanidine, dicyandiamide, 2-oxazolidinone); alkylene carbonate compounds (e.g. 1,3-dioxolan-2-one, 4-methyl-1,3-dioxolan-2-one, 4,5-dimethyl-1,3-dioxolan-2-one, 4,4-dimethyl-1,3-dioxolan-2-one, 4-ethyl-1,3-dioxolan-2-one, 4-hydroxymethyl-1,3-dioxolan-2-one, 1,3-dioxan-2-one, 4-methyl-1,3-dioxan-2-one, 4,6-dimethyl-1,3-dioxan-2-one, and 1,3-dioxopan-2-one); haloepoxy compounds (e.g. epichlorohydrin, epibromohydrin, and α-methylepichlorohydrin) and their polyamine-added products (e.g. Kymene (registered trademark) produced by Hercules); silane coupling agents (e.g. γ-glycidoxypropyltrimethoxysilane and γ-aminopropyltriethoxysilane); oxetane compounds (e.g. 3-methyl-3-oxetanemethanol, 3-ethyl-3-oxetanemethanol, 3-butyl-3-oxetanemethanol, 3-methyl-3-oxetaneethanol, 3-ethyl-3-oxetaneethanol, 3-butyl-3-oxetaneethanol, 3-chloromethyl-3-methyloxetane, 3-chloromethyl-3-ethyloxetane, and polyoxetane compounds); and polyvalent metal compounds (e.g. hydroxides and chlorides of such as zinc, calcium, magnesium, aluminum, iron and zirconium). These surface-crosslinking agents may be used either alone respectively or in combinations with each other. Above all, the polyhydric alcohols are favorable, because they are high in safety and can enhance the hydrophilicity of water-absorbent resin particle surfaces. In addition, the use of the polyhydric alcohols enhances the affinity of water-absorbent resin particle surfaces to the polyvalent metal particles, so that interactions between the polyhydric alcohol residue and the polyvalent metal surface enable more uniform existence of the polyvalent metal particles on surfaces of the water-absorbent resin particles.

The amount of the surface-crosslinking agent, as used, is favorably in the range of 0.001 to 5 weight parts per 100 weight parts of the solid content of the water-absorbent resin particles.

When the surface-crosslinking agent and the water-absorbent resin particles are mixed together, water may be used. The amount of water, as used, is favorably larger than 0.5 but not larger than 10 weight parts, more favorably in the range of 1 to 5 weight parts, per 100 weight parts of the solid content of the water-absorbent resin particles.

When the surface-crosslinking agent and/or its aqueous solution is mixed, a hydrophilic organic solvent and/or a third substance may be used as a mixing assistant.

In the case where the hydrophilic organic solvent is used, its examples include: lower alcohols (e.g. methyl alcohol, ethyl alcohol, n-propyl alcohol, isopropyl alcohol, n-butyl alcohol, isobutyl alcohol, and t-butyl alcohol); ketones (e.g. acetone); ethers (e.g. dioxane, tetrahydrofuran, and methoxy (poly)ethylene glycol); amides (e.g. ε-caprolactam and N,N-dimethylformamide); sulfoxides (e.g. dimethyl sulfoxide); and polyhydric alcohols (e.g. ethylene glycol, diethylene glycol, propylene glycol, triethylene glycol, tetraethylene glycol, polyethylene glycol, 1,3-propanediol, dipropylene glycol, 2,2,4-trimethyl-1,3-pentanediol, polypropylene glycol, glycerol, polyglycerol, 2-butene-1,4-diol, 1,3-butanediol, 1,4-butanediol, 1,5-pentanediol, 1,6-hexanediol, 1,2-cyclohexanedimethanol, 1,2-cyclohexanol, trimethylolpropane, diethanolamine, triethanolamine, polyoxypropylene, oxyethylene-oxypropylene block copolymers, pentaerythritol, and sorbitol). Incidentally, the polyhydric alcohols may be used as crosslinking agents by appropriately selecting the temperature and time, or as solvents without being made to react at all, or as both.

Though depending on such as kind, particle diameters, and water content of the water-absorbent resin particles, the amount of the hydrophilic organic solvent as used is favorably not larger than 10 weight parts, more favorably in the range of 0.1 to 5 weight parts, per 100 weight parts of the solid content of the water-absorbent resin particles. In addition, as the third substance, there may be caused to coexist those which are disclosed in EP 0668080, such as inorganic acids, organic acids, and polyamino acids. These mixing assistants may act as surface-crosslinking agents, but are favorably those which do not give surface-crosslinked water-absorbent resin particles having low water absorption performance. Particularly, volatile alcohols having boiling points of lower than 150° C. are desirable in that they volatilize during the surface-crosslinking treatment and thus their residues do not remain.

When the water-absorbent resin particles and the surface-crosslinking agent are mixed together, there may be caused to coexist a noncrosslinkable water-soluble inorganic base (favorably: alkaline metal salts, ammonium salts, alkaline metal hydroxides, and ammonia or its hydroxide) and/or an irreducible alkaline-metal-salt pH buffer (favorably such as hydrogencarbonates, dihydrogenphosphates, and hydrogenphosphates) for the purpose of more uniformly mixing the water-absorbent resin particles and the surface-crosslinking agent together. The amount of these materials, as used, depends upon such as type or particle diameters of the water-absorbent resin particles, but is favorably in the range of 0 to 10 weight parts, more favorably 0.05 to 5 weight parts, per 100 weight parts of the solid content of the water-absorbent resin particles.

Although not especially limited, the method for mixing the water-absorbent resin particles and the surface-crosslinking agent together can be exemplified by such as: a method in which the water-absorbent resin particles are immersed into the hydrophilic organic solvent and then mixed with the surface-crosslinking agent that is, if necessary, dissolved in water and/or a hydrophilic organic solvent; and a method in which the surface-crosslinking agent that is dissolved in water and/or the hydrophilic organic solvent is spraywise or dropwise added directly to the water-absorbent resin particles to mix them together. In addition, in the case where the surface-crosslinking agent solution is sprayed, the size of liquid droplets being sprayed is favorably in the range of 1 to 300 μm, more favorably 2 to 200 μm.

After the mixing of the water-absorbent resin particles and the surface-crosslinking agent, usually, a heating treatment is favorably carried out to conduct the crosslinking reaction. Though depending on the surface-crosslinking agent as used, the temperature of the above heating treatment is favorably in the range of 40 to 250° C., more favorably 150 to 250° C. In the case where the treatment temperature is lower than 40° C., the absorption properties such as absorption capacity under a load are sometimes not sufficiently improved. In the case where the treatment temperature is higher than 250° C., the deterioration of the water-absorbent resin particles is sometimes caused, so that the performance is lowered, therefore caution is needed. The duration of the heating treatment is favorably in the range of 1 minute to 2 hours, more favorably 5 minutes to 1 hour.

The aqueous-liquid-absorbing agent according to the present invention comprises the above-described water-absorbent resin particles as essential components.

In the case where the aqueous-liquid-absorbing agent according to the present invention comprises water-absorbent resin particles which have not yet been subjected to the treatment for liquid permeability enhancement, it is favorable that this aqueous-liquid-absorbing agent further comprises the liquid-permeability-enhancing agent in the aforementioned content.

In the case where the aqueous-liquid-absorbing agent according to the present invention comprises water-absorbent resin particles which have been subjected to the treatment for liquid permeability enhancement, these water-absorbent resin particles may be used alone as the aqueous-liquid-absorbing agent according to the present invention.

The aqueous-liquid-absorbing agent according to the present invention may further comprise such as deodorants, antibacterial agents, reducing agents, oxidants, and chelating agents in the range of 0 to 10 weight % relative to the water-absorbent resin particles.

The aqueous-liquid-absorbing agent according to the present invention exhibits an absorption rate (FSR) of not less than 0.2 g/g/s, more favorably not less than 0.3 g/g/s, still more favorably not less than 0.5 g/g/s, particularly favorably not less than 0.7 g/g/s. Its upper limit value is not especially limited. However, the absorption rate (FSR) is favorably not more than 10 g/g/s, more favorably not more than 5 g/g/s. In the case where the absorption rate (FSR) is less than 0.2 g/g/s, there is, for example, a possibility that the urine may unfavorably leak without being sufficiently absorbed when the agent is used in diapers.

The aqueous-liquid-absorbing agent according to the present invention exhibits a water absorption capacity (CRC) of 5 to 25 g/g, more favorably 10 to 20 g/g. In the case where the water absorption capacity (CRC) is less than 5 g/g, the aqueous-liquid-absorbing agent must be used in a large amount, for example, so that the diaper unfavorably becomes thick. In the case where the water absorption capacity (CRC) is more than 25 g/g, there is a possibility that the liquid permeability may be inferior.

The aqueous-liquid-absorbing agent according to the present invention exhibits an absorption capacity under load (AAP) in the range of favorably 5 to 25 g/g, more favorably 11 to 22 g/g. In the case where the absorption capacity under load (AAP) is less than 5 g/g, the aqueous-liquid-absorbing agent must be used in a large amount, for example, so that the diaper unfavorably becomes thick. In the case where the absorption capacity under load (AAP) is more than 25 g/g, there is a possibility that the liquid permeability may be inferior.

As to the aqueous-liquid-absorbing agent according to the present invention, the value (AAP/CRC) given by dividing the absorption capacity under load (AAP) by the water absorption capacity (CRC) is favorably in the range of 1.00 to 2.20, more favorably 1.10 to 2.00, still more favorably 1.15 to 1.90. In the case where the value (AAP/CRC) given by dividing the absorption capacity under load (AAP) by the water absorption capacity (CRC) is less than 1.00, the aqueous-liquid-absorbing agent must be used in a large amount, for example, so that the diaper unfavorably becomes thick. In the case where the value (AAP/CRC) given by dividing the absorption capacity under load (AAP) by the water absorption capacity (CRC) is more than 2.20, there are, for example, disadvantages of resulting in a large wet-back amount when the agent is used in diapers. As to conventional water-absorbent resin particles, the AAP/CRC is less than 1.00. However, the aqueous-liquid-absorbing agent according to the present invention is further characterized in that the AAP/CRC is in the above favorable range.

The aqueous-liquid-absorbing agent according to the present invention has an extractable component content in, the range of favorably 0 to 15 weight %, more favorably 0 to 10 weight %, still more favorably 0 to 8 weight %. In the case where the extractable component content is higher than 15 weight %, there is, for example, a possibility that the agent may cause a skin eruption when used in such as diapers.

The aqueous-liquid-absorbing agent according to the present invention exhibits a saline flow conductivity (SFC) of not less than $400 \times 10^{-7}$ cm$^3$·s/g, more favorably not less than $500 \times 10^{-7}$ cm$^3$·s/g, still more favorably not less than $700 \times 10^{-7}$ cm$^3$·s/g, particularly favorably not less than $1,000 \times 10^{-7}$ cm$^3$·s/g. Its upper limit value is not especially limited. However, the saline flow conductivity (SFC) is favorably not more than $4,000 \times 10^{-7}$ cm$^3$·s/g, more favorably not more than $3,000 \times 10^{-7}$ cm$^3$·s/g. In the case where the saline flow conductivity (SFC) is less than $400 \times 10^{-7}$ cm$^3$·s/g, there is, for example, a possibility that the urine may become difficult to diffuse in absorbent structures and therefore become difficult to absorb into diapers, thus causing its leakage.

The aqueous-liquid-absorbing agent according to the present invention exhibits a wet porosity of not less than 20%, more favorably not less than 30%, still more favorably not less than 35%. Its upper limit value is not especially limited. However, the wet porosity is favorably not more than 60%, more favorably not more than 50%. In the case where the wet porosity is less than 20%, there is, for example, a possibility of resulting in an increased wet-back amount if a comparatively large amount of urine is excreted when the agent is used in diapers.

The aqueous-liquid-absorbing agent according to the present invention combines the four physical properties, namely, the absorption rate (FSR) of not less than 0.2 g/g/s, the water absorption capacity (CRC) of 5 to 25 g/g, the saline flow conductivity (SFC) of not less than $400 \times 10^{-7}$ cm$^3$·s/g, and the wet porosity of not less than 20%, with good balance. Therefore, this agent can sufficiently exercise the effects of the present invention. In the case where even one of these physical properties is unfavorably lacked, there is a possibility that the effects of the present invention cannot sufficiently be obtained.

The shape of the aqueous-liquid-absorbing agent according to the present invention is free of especial limitation if it satisfies the aforementioned physical properties. However, examples of this shape include a sheet shape and a fibrous shape. A particularly favorable shape is the particulate shape.

In the case where the aqueous-liquid-absorbing agent used in the present invention is particulate, the particle diameters and particle diameter distribution of this agent are free of especial limitation. However, for still more exercising the effects of the present invention, it is favorable that the weight-average particle diameter of this agent is in the range of 150 to 500 μm, more favorably 200 to 400 μm, still more favorably 250 to 380 μm, and also it is favorable that the logarithmic standard deviation (σζ) of this agent is in the range of 0.45 to 0.20, more favorably 0.35 to 0.22, still more favorably 0.30 to 0.25.

In the case where the aqueous-liquid-absorbing agent according to the present invention is a particulate aqueous-liquid-absorbing agent, then, for still more exercising the effects of the present invention, it is favorable that this agent includes particles having particle diameters in the range of 150 to 600 μm in an amount of 90 to 100 weight %, more favorably 95 to 100 weight %, and also it is more favorable that this agent includes particles having particle diameters in the range of 150 to 500 μm in an amount of 90 to 100 weight %, particularly favorably 95 to 100 weight %. In the case where particles of smaller than 150 μm in particle diameter are included in a large amount, there is a possibility that the liquid permeability may be so poor as to result in failure to sufficiently exercise the effects of the present invention. In the case where particles of larger than 600 μm in particle diameter are included in a large amount, there is a possibility that, on the occasion of the practical use, for example, an unpleasant feeling may be given to human bodies during the contact therewith.

The aqueous-liquid-absorbing agent according to the present invention combines the four physical properties, namely, the absorption rate (FSR), the water absorption capacity (CRC), the saline flow conductivity (SFC), and the wet porosity, with good balance. Therefore, this agent is used favorably for uses in such as: sanitary materials (e.g. diapers); water-absorbing agents for potable toilets; solidifying agents for waste liquids; and water-retaining agents for agriculture; and is favorable particularly for the sanitary materials (e.g. diapers).

DETAILED DESCRIPTION OF THE PREFERRED EMBODIMENTS

Hereinafter, the present invention is more specifically illustrated by the following Examples of some preferred embodiments in comparison with Comparative Examples not according to the present invention. However, the present invention is not limited to them. Hereinafter, for convenience, the units "weight part(s)" and "liter(s)" may be referred to simply as "part(s)" and "L" respectively. In addition, the unit "weight %" may be referred to as "wt %".

The measurement and evaluation methods in the Examples and the Comparative Examples are shown below.

In addition, unless otherwise noted, the following measurement and evaluation are stated as having been carried out under conditions of a room temperature (25° C.) and a humidity of 50 RH %.

Incidentally, the following statement is made on the assumption that the aqueous-liquid-absorbing agent is measured. However, it may be applied to such as water-absorbent resin (particles) and water-absorbent resin composition. In addition, in the case where a commercially available water-absorbent resin or a water-absorbent resin separated from a diaper is measured, it is measured after having appropriately been dried under a reduced pressure (e.g. at 60 to 80° C. for 16 hours) so as to have a solid content of 90 to 100 weight %.

<Water Absorption Capacity (CRC)>:

An amount of 0.200 g of aqueous-liquid-absorbing agent was uniformly placed into a bag (60 mm×60 mm) made of nonwoven fabric (trade name: Heatron Paper, type: GSP-22, produced by Nangoku Pulp Kogyo Co., Ltd.) and then immersed into a physiological saline solution (hereinafter the physiological saline solution all refers to a 0.9 weight % aqueous sodium chloride solution) of which the temperature had been adjusted to 25° C. After 30 minutes, the bag was pulled up and then drained of water by a centrifugal force of 250 cm/s² (250 G) with a centrifugal separator (produced by Kokusan Co., Ltd., centrifugal separator: model H-122) for 3 minutes, and then the weight W1 (g) of the bag was measured. In addition, the same procedure as the above was carried out without the aqueous-liquid-absorbing agent, and the resultant weight W0 (g) was measured. Then, the CRC (g/g) was calculated from these W1 and W0 in accordance with the following equation:

$$CRC\ (g/g) = [(W1\ (g) - W0\ (g))/\text{weight (g) of aqueous-liquid-absorbing agent}] - 1$$

<Absorption Capacity Under Load (AAP)>:

The absorption capacity under load (AAP) refers to an absorption capacity for a physiological saline solution (0.9 weight % aqueous sodium chloride solution) under a load of 4.83 kPa in 60 minutes.

The measurement was carried out with an apparatus as shown in FIG. 1.

A stainless metal gauze 101, which was a screen of 400 meshes (mesh opening size: 38 μm), was fused to a bottom of a plastic supporting cylinder 100 having an inner diameter of 60 mm. Then, under conditions of a room temperature (23.0±2.0° C.) and a humidity of 50 RH %, onto the above metal gauze, there was uniformly spread 0.90 g of aqueous-liquid-absorbing agent 102, and further thereon, there were mounted a piston 103 and a load 104 in sequence, wherein the piston had an outer diameter of only a little smaller than 60 mm and made no gap with the inner wall surface of the supporting cylinder, but was not hindered from moving up and down, and wherein the piston and the load were adjusted so that a load of 4.83 kPa (0.7 psi) could uniformly be applied to the aqueous-liquid-absorbing agent. Then, the weight Wa (g) of the resultant one set of measurement apparatus was measured.

A glass filter plate 106 having a diameter of 90 mm (produced by Sogo Rikagaku Glass Seisakusho Co., Ltd., pore diameter: 100 to 120 μm) was mounted inside a Petri dish 105 having a diameter of 150 mm, and then a physiological saline solution (0.9 weight % aqueous sodium chloride solution) 108 (20 to 25° C.) was added up to the same level as the upside of the glass filter plate, on which a filter paper 107 having a diameter of 90 mm (produced by ADVANTEC Toyo Co., Ltd., trade name: (JIS P 3801, No. 2), thickness: 0.26 mm, diameter of captured particles: 5 μm) was then mounted so that its entire surface would be wetted, and further, an excess of liquid was removed.

The one set of measurement apparatus was mounted on the above wet filter paper, thereby getting the liquid absorbed under the load for a predetermined duration. This absorption duration was defined as 1 hour from the start of the measurement. Specifically, 1 hour later, the one set of measurement apparatus was removed by being lifted to measure its weight Wb (g). This measurement of the weight must be carried out as quickly as possible and so as not to give any vibration. Then, the absorption capacity under load (AAP) (g/g) was calculated from the Wa and Wb in accordance with the following equation:

$$AAP\ (g/g) = [Wb\ (g) - Wa\ (g)]/\text{weight (g) of aqueous-liquid-absorbing agent}$$

<Absorption Rate (FSR)>:

An amount (unit: g) ($W_A$) (calculated from the below-mentioned equation (a)) of aqueous-liquid-absorbing agent was weighed out precisely to the fourth decimal place. This aqueous-liquid-absorbing agent as weighed out was placed into a 25 ml glass beaker (diameter: 32-34 mm, height: 50 mm), when the upside of the aqueous-liquid-absorbing agent as placed into the beaker was made horizontal. If necessary, a treatment such as of cautiously tapping the beaker may be carried out to make the surface of the aqueous-liquid-absorbing agent horizontal. Next, 20 ml of physiological saline solution (0.9 weight % aqueous sodium chloride solution), of which the temperature had been adjusted to 23.0±2.0° C., was weighed out into a 50 ml glass beaker, and then the weight (unit: g) was measured to the fourth decimal place ($W_1$). Then, the physiological saline solution as weighed out was carefully and quickly poured into the 25 ml beaker containing the aqueous-liquid-absorbing agent. The time measurement was started at the same time as when the poured physiological saline solution contacted with the aqueous-liquid-absorbing agent. Then, the upside of the physiological saline solution in the beaker into which the physiological saline solution had been poured was observed at an angle of about 20° with the eye. Then, the time measurement was ended when the upside, which had been the liquid surface of the physiological saline solution at the start, had been replaced by the surface of the aqueous-liquid-absorbing agent (having absorbed the physiological saline solution) as a result of the absorption of the physiological saline solution into the aqueous-liquid-absorbing agent (unit: sec) ($t_s$). Next, the weight (unit: g) of the physiological saline solution, which remained attaching to the 50 ml beaker after the pouring of the physiological saline solution, was measured to the fourth decimal place ($W_2$). The weight ($W_F$, unit: g) of the poured physiological saline solution was determined from the equation (b) below.

The absorption rate (FSR) was calculated from the equation (c) below.

$$W_A\ (g) = 20\ (g)/(0.75 \times CRC\ (g/g)) \qquad \text{Equation (a)}$$

$$W_F\ (g) = W_1\ (g) - W_2\ (g) \qquad \text{Equation (b)}$$

$$FSR\ (g/g/s) = W_F/(t_s \times W_A) \qquad \text{Equation (c)}$$

The same measurement was carried out repeatedly three times per one sample. The measurement result was defined as the average value of the three-time-measured values.

<Saline Flow Conductivity (SFC)>:
(SFC Measurement Apparatus):

This measurement is to measure the saline flow conductivity (SFC) of a gel layer formed in an aqueous-liquid-absorbing agent which has absorbed the physiological saline solution under load and thereby swollen.

This measurement of the saline flow conductivity (SFC) uses Darcy's law and the stationary-flow method (e.g. refer to "Absorbency", edited by P. K. Chatterjee, Elsevier 1985, pp. 42-43 and Chemical Engineering, Vol. II, 3rd edition, J. M. Coulson and J. F. Richarson, Pergamon Press, 1978, pp. 125-127).

Figure 2:
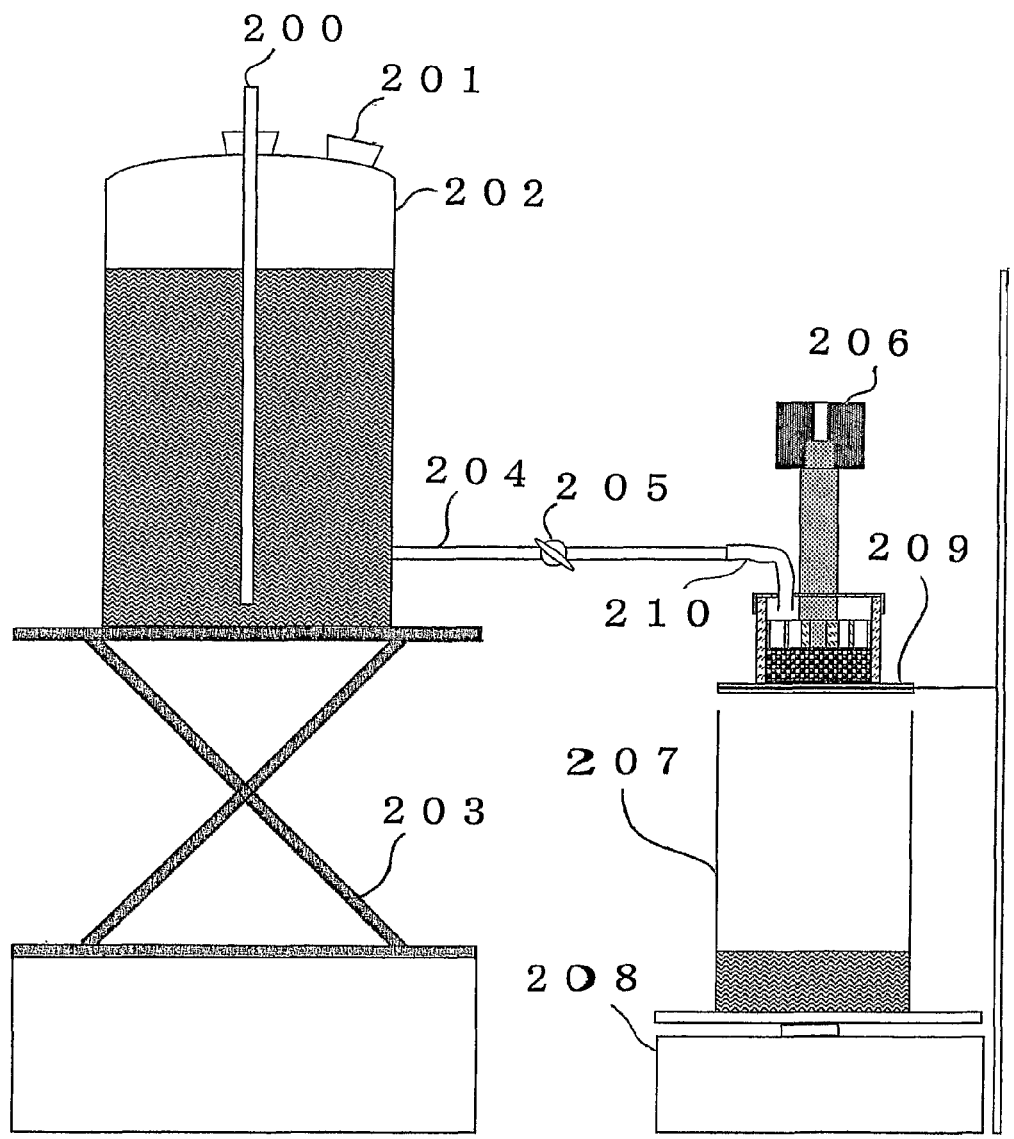
FIG. 2 is a schematic sectional view of a measurement apparatus as used for measuring the SFC.

An apparatus favorable for this measurement is illustrated in FIG. 2. This apparatus has a storage tank (202) of about 5 L in capacity as put on a laboratory jack (203). The storage tank (202) has an end-open glass tube and a rubber stopper part (200) which have been provided thereto in order to obtain a function of keeping the hydrostatic height constant. To the storage tank (202), there can be added a liquid by removing a rubber stopper part (201). The storage tank (202) has an liquid outlet therein below the liquid surface, and a glass tube (204) having a valve (205) is connected to this outlet. The liquid feed can be controlled by opening and closing the valve (205). The glass tube (204) is connected to a flexible tube (210). The other end of the flexible tube (210) is set so as to feed a liquid to an SFC instrument (206) as illustrated in its entirety. The SFC instrument (206) was set on a support (209) having a stainless wire mesh of 1 mm in mesh opening size. Under the support (209), there is disposed a collection tank (207) for liquid collection. The collection tank (207) is disposed on a balance (208). The balance (208) is wired to a computer so that the weight of the collected liquid can be taken in every definite time.

Incidentally, in FIG. 2, in order to facilitate the understanding of this drawing figure, the right-hand apparatus (e.g. SFC instrument 206, collection tank 207, balance 208, support 209) is illustrated on a scale enlarged in comparison with the reduced scale of the left-hand apparatus.

Figure 3:
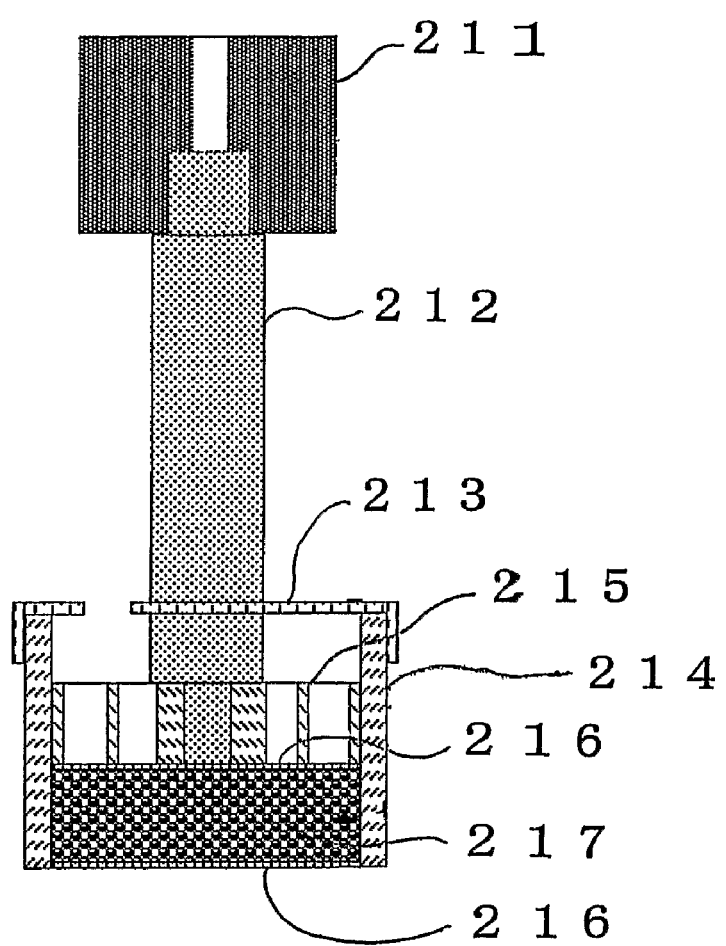
FIG. 3 is a schematic sectional view of a portion of the measurement apparatus as used for measuring the SFC.
Figure 4:
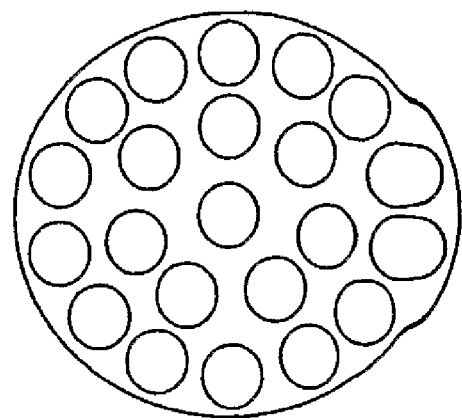
FIG. 4 is a bottom view of a piston head of the measurement apparatus as used for measuring the SFC.

As to FIG. 3, the SFC instrument basically includes: a cylinder (214) (obtained by processing LEXAN® or its equivalent) having a stainless wire mesh at the bottom; a piston (212) (obtained by processing LEXAN® or its equivalent); a cover (213) (obtained by processing LEXAN® or its equivalent) having an opening for insertion of the liquid-feeding tube; and a weight (211). The piston (212) has a piston head (215) through which holes are made as illustrated in FIG. 3. The holes of the piston head (215) have the cylindrical structure which is penetrating in upside and downside directions of the piston head (215) as illustrated in FIG. 4. On the bottom of the piston head (215), there is stuck a wire mesh (216) of 400 meshes (mesh opening size: 38 μm) (produced by Weisse & Eschrich, material: SUS 304, mesh opening width: 0.038 mm, wire diameter: 0.025 mm). The piston head (215) has a diameter only a little smaller than the inner diameter of the cylinder (214) and has such a size as allows the piston head (215) to smoothly migrate inside the cylinder (214) without being hindered from moving up and down. The top end of the shaft of the piston (212) is processed so that the weight can be set there. The cylinder (214) has an inner diameter of 6.00 cm (bottom area 28.27 cm$^2$), a wall thickness of 0.5 cm, and a height of 6.0 cm. On the bottom of the cylinder (214), there is stuck a wire mesh (216) of 400 meshes (mesh opening size: 38 μm) (produced by Weisse & Eschrich, material: SUS 304, mesh opening width: 0.038 mm, wire diameter: 0.025 mm). The cover (213) has a hole of a size only a little larger than the outer diameter of the shaft of the piston (212) so that the shaft of the piston (212) can smoothly migrate without being hindered from moving up and down. In addition, the cover (213) has the opening for insertion of the liquid-feeding tube. The total weight of the weight (211) and the piston (212) is adjusted so that a load of 2.07 kPa (0.3 psi) can be applied to the bottom of the cylinder.

(SFC Measurement Method):

First of all, the height ($h_0$: unit=mm, number of significant figures=4) and weight ($W_0$: unit=g, number of significant figures=4) of the SFC instrument, including the cylinder (214), the piston (212), the cover (213), and the weight (211), were measured before the aqueous-liquid-absorbing agent was placed into it, in other words, in an empty state. Next, 3.00±0.05 g of aqueous-liquid-absorbing agent was weighed out (W: unit=g, number of significant figures=4). The amount of the aqueous-liquid-absorbing agent being weighed out is favorably adjusted so that the below-mentioned "d final" will be in the range of 10 to 20 mm. For example, in the case where the water absorption capacity (CRC) is in the range of 5 to 15 g/g, the amount of the aqueous-liquid-absorbing agent being weighed out is adjusted to 3.00±0.05 g. In the case where the water absorption capacity (CRC) is in the range of 16 to 20 g/g, the amount of the aqueous-liquid-absorbing agent being weighed out is adjusted to 2.00±0.03 g. In the case where the water absorption capacity (CRC) is in the range of 21 to 28 g/g, the amount of the aqueous-liquid-absorbing agent being weighed out is adjusted to 1.60±0.03 g. In the case where the water absorption capacity (CRC) is more than 28 g/g, the amount of the aqueous-liquid-absorbing agent being weighed out is adjusted to 0.90±0.01 g. The weighed-out aqueous-liquid-absorbing agent was placed on the entire bottom of the cylinder (214) so as to carefully and uniformly be dispersed there. Thereafter, the piston (212), the cover (213), and the weight (211) are set to measure the height ($h_1$: unit=mm) of the SFC instrument. Next, a physiological saline solution (0.9 weight % aqueous sodium chloride solution) was added into a Petri dish of at least 16 cm in diameter and at least 4 cm in height so that the SFC instrument could be immersed by at least 3 cm from its bottom. A filter paper of 90 mm in diameter (filter paper produced by ADVANTEC Co., Ltd.: No. 2) was laid on the inner bottom of the Petri dish. The SFC instrument containing the aqueous-liquid-absorbing agent was mounted on the filter paper to swell the aqueous-liquid-absorbing agent for 60 minutes. After the aqueous-liquid-absorbing agent had been swollen for 60 minutes in this way, the SFC instrument was removed from the Petri dish to measure the height ($h_2$: unit=mm, number of significant figures=4) and weight ($W_2$: unit=g, number of significant figures=4) of the SFC instrument. Thereafter, the SFC instrument was moved and set onto the support (209) of the SFC measurement apparatus, and the flexible tube (210) was set into the insertion opening. Next, the valve (205) was opened to thereby start feeding the liquid. After this start of the liquid feeding, the hydrostatic height in the cylinder was adjusted so as to be kept at 5 cm until the amount (indicated by the balance) of the liquid, having passed through the gel layer and then been collected, reached about 200 g. This adjustment may be carried out either by adjusting the height of the laboratory jack (203) or by adjusting the height of the lower portion of the glass tube as inserted from the upper portion of the storage tank (202). When the hydrostatic height in the cylinder had been adjusted so as to be kept at 5 cm, then the weight data of the liquid, having passed through the gel layer and then been collected, started to be taken in by the computer as connected with the balance. The data intake was carried out every 5 sec until 180 sec. However, if the amount of the collected liquid reached not smaller than 2 kg within 180 see after the start of the data intake, then, at that point of time (e.g. 120 sec), the data intake was ended. After the end of the data intake, the valve (205) was quickly closed. Thereafter, when the liquid had almost come not to flow down from the bottom of the cylinder (214) of the SFC instrument (when the hydrostatic height in the cylinder (214) had agreed with the height of the gel layer), the height ($h_3$: unit=mm, number of significant figures=4) of the SFC instrument was measured. Thereafter, the SFC instrument was moved onto a cylindrical instrument (having the same inner diameter as of the cylinder of the SFC instrument) to drip water off for 30 minutes. This operation is to put the SFC instrument on the cylindrical instrument to thereby make the dripping-off of water carried out favorably in a state where the bottom of the wire mesh, on which the aqueous-liquid-absorbing agent in the cylinder is disposed, is not in direct contact with anything. After the dripping-off of water had been carried out for 30 minutes in the above way, the height ($h_4$: unit=mm, number of significant figures=4) and weight ($W_4$: unit=g, number of significant figures=4) of the SFC instrument were measured.

(Calculation of SFC):

The data as taken in by the computer were plotted on a graph by indicating the time t (sec) as the X-axis and the weight (g) of the collected liquid as the Y-axis. The resultant plots were approximated to a straight line by the method of least squares, and then the rate (unit: g/s) of this straight line was determined.

The SFC was determined from the following equation:

$$SFC(\times 10^{-7}\,cm^3 \cdot s/g) = (d\,final \times rate)/(Area \times Density \times Pressure) \times 10,000,000$$

wherein:
Area ($cm^2$)=28.27
Density ($g/cm^3$)=1.005 (the density of the 0.9 weight % physiological saline solution at 20° C. is used)
d final (cm)=$\{(h_2-h_0)+(h_3-h_0)\}/2/10$ <Wet Porosity>:

The measurement of the wet porosity is carried out subsequently to the measurement of the saline flow conductivity (SFC).

A five-ply filter paper (10 cm×10 cm, produced by Ahlstrom, Grade: 989) was set on a horizontal experimental stand. Then, the SFC instrument having been subjected to the dripping-off of water for 30 minutes was put on the above five-ply filter paper for 10 minutes. Thereafter, the SFC instrument was moved onto a separately prepared new five-ply filter paper of the same as the aforementioned. After 16±2 hours, the height ($h_5$: unit=mm) and weight ($W_5$: unit=g) of the SFC instrument were measured. Incidentally, the specifications of the aforementioned filter papers are described in the EDANA strikethrough test.

The wet porosity was calculated from the following equation:

$$\text{Wet Porosity (unit: \%)} = [(W_3-W_4-0.7)/\{h_4-h_0\}\times 28.27]\times 100$$

<Particle Diameters>:

Water-absorbent resin particles or aqueous-liquid-absorbing agents, having been pulverized, were classified with JIS standard sieves having mesh opening sizes of 850 μm, 710 μm, 600 μm, 500 μm, 425 μm, 300 μm, 212 μm, 150 μm, and 45 μm. Then, the percentages R of the residues on these sieves were plotted on a logarithmic probability paper. Therefrom, the weight-average particle diameter (D50) was read.

<Logarithmic Standard Deviation (σζ) of Particle Diameter Distribution>:

Water-absorbent resin particles or aqueous-liquid-absorbing agents were classified with JIS standard sieves having mesh opening sizes of 850 μm, 710 μm, 600 μm, 500 μm, 425 μm, 300 μm, 212 μm, 150 μm, and 45 μm. Then, the percentages R of the residues on these sieves were plotted on a logarithmic probability paper. Thus, if X1 is defined as a particle diameter when R=84.1 weight %, and if X2 is defined as a particle diameter when R=15.9 weight %, then the logarithmic standard deviation (σζ) is shown by the following equation. The smaller σζ value shows the narrower particle diameter distribution.

$$\sigma\zeta = 0.5 \times \ln(X2/X1)$$

As to the classification method for measuring the particle diameters and the logarithmic standard deviation (σζ) of the particle diameter distribution, 10.0 g of water-absorbent resin particles or aqueous-liquid-absorbing agent was placed onto JIS standard sieves (having mesh opening sizes of 850 μm, 710 μm, 600 μm, 500 μm, 425 μm, 300 μm, 212 μm, 150 μm, and 45 μm) (THE IIDA TESTING SIEVE: diameter=8 cm) and then classified with a shaking classifier (IIDA SIEVE SHAKER, TYPE: ES-65 type, SER. No. 0501) for 5 minutes.

<Bulk Density>:

The bulk density of the water-absorbent resin particles or aqueous-liquid-absorbing agent was measured by the method as described in edana 460.1-99.

<Extractable Component Content>:

Into a plastic receptacle of 250 ml in capacity having a lid, 184.3 g of physiological saline solution (0.9 weight % aqueous sodium chloride solution) was weighed out. Then, 1.00 g of water-absorbent resin or aqueous-liquid-absorbing agent was added to this aqueous solution, and they were stirred for 16 hours, thereby extractable components were extracted from the resin. The resultant extract liquid was filtrated with a filter paper (produced by ADVANTEC Toyo Co., Ltd., trade name: (JIS P 3801, No. 2), thickness: 0.26 mm, diameter of captured particles: 5 μm), and then 50.0 g of the resultant filtrate was weighed out and used as a measuring solution.

To begin with, only the physiological saline solution was firstly titrated with an aqueous 0.1N NaOH solution until the pH reached 10, and then the resultant solution was titrated with an aqueous 0.1N HCl solution until the pH reached 2.7, thus obtaining blank titration amounts ([bNaOH] ml and [bHCl] ml).

The same titration procedure was carried out also for the measuring solution, thus obtaining titration amounts ([NaOH] ml and [HCl] ml).

For example, if the water-absorbent resin comprised acrylic acid and its sodium salt in known amounts, the extractable component content of the water-absorbent resin was calculated from the average molecular weight of the monomers and the titration amounts, as obtained from the above procedures, in accordance with the following equation. In the case of unknown amounts, the average molecular weight of the monomers was calculated from the neutralization degree as determined by the titration.

$$\text{Extractable component content (weight \%)} = 0.1 \times (\text{average molecular weight}) \times 184.3 \times 100 \times ([HCl]-[bHCl])/1{,}000/1.0/50.0$$

$$\text{Neutralization degree (mol \%)} = [1-([NaOH]-[bNaOH])/([HCl]-[bHCl])] \times 100$$

EXAMPLE 1

(Operation 1-1):

In a polypropylene-made container of 80 mm in inner diameter and 1 liter in capacity as covered with polystyrene foam being a heat insulator, a solution (B) was quickly added to a solution (A) (being stirred with a magnetic stirrer) to mix them together, thus obtaining an aqueous monomer solution (C). Hereupon, the solution (A) had been prepared by mixing 190.18 g of acrylic acid, 6.9 g (0.5 mol %) of polyethylene glycol diacrylate (molecular weight: 523), and 1.13 g of a 1.0 weight % aqueous pentasodium diethylenetriaminepentaacetate solution together. And the solution (B) had been prepared by mixing 130.60 g of a 48.5 weight % aqueous sodium hydroxide solution and 166.80 g of ion-exchanged water (of which the temperature had been adjusted to 50° C.) together. As to the aqueous monomer solution (C), its liquid temperature rose to about 100° C. due to the neutralization heat and the dissolution heat.

Next, 4.4 g of a 3 weight % aqueous sodium persulfate solution was added to this aqueous monomer solution (C) to stir them together for several seconds. Immediately thereafter, the resultant mixture was poured into a stainless vat type container (having: a surface temperature as heated to 100° C. with a hot plate (NEO HOTPLATE H1-1000, produced by Inouchiseieido K.K.); an inner surface as coated with Teflon (registered trademark); and a bottom of 250×250 mm) in an open system. The stainless vat type container is such that: the size is bottom=250×250 mm, top=640×640 mm, height=50 mm; the central section is trapezoidal; and the top is open.

Shortly after the above pouring of the aqueous monomer solution into the vat, polymerization started. While water vapor was emitted with expansion in all directions and foaming, the polymerization proceeded. Thereafter, there occurred a shrinkage to the size a little larger than the bottom. These expansion and shrinkage had ended within about 1 minute. Then, after having been retained in the polymerization container for 4 minutes, the resultant hydropolymer (hydrogel) was got out. Incidentally, this series of operations was carried out in the system open into the air.

(Operation 1-2):

The resultant hydropolymer (hydrogel) was cut into the shape of rectangles of 3 cm in width and then pulverized and agglomerated with a forward extrusion type screw extrusion agglomeration machine having a spherical-surface-shaped die (Dome Gran, produced by Fuji Paudal Co., Ltd., MODEL: DG-L1, die perforation diameter=1.2 mm, die thickness=1.2 mm, clearance between the extrusion action part and the die=1 mm), thus obtaining a hydropolymer having been divided into small pieces (pulverized gel particles). When the above pulverization and agglomeration were carried out with the extrusion agglomeration machine, they were carried out while the hydropolymer was supplied at 300 g/minute and, at the same time, pure water was added at 90 g/minute. Incidentally, the number of revolutions of the screw was 50 rpm.

(Operation 1-3):

The resultant pulverized gel particles having been divided into small pieces were spread onto a metal gauze of 50 meshes (mesh opening size: 300 μm) and then dried with hot air of 180° C. for 40 minutes. Next, the dried product was pulverized with a roll mill and then classified with JIS standard sieves having mesh opening sizes of 600 μm and 150 μm, thus obtaining a water-absorbent resin of an irregularly pulverized shape, which had a weight-average particle diameter of 324 μm and a logarithmic standard deviation ($\sigma\zeta$) of 0.32 (solid content: 96 weight %).

(Operation 1-4):

An amount of 100 weight parts of the resultant water-absorbent resin was uniformly mixed with a surface-crosslinking agent solution comprising a mixed liquid of 0.3 weight part of 1,4-butanediol, 0.6 weight part of propylene glycol, 3.0 weight parts of pure water, and 1.0 weight part of isopropyl alcohol. Then, the water-absorbent resin, which had been mixed with the surface-crosslinking agent solution, was uniformly spread into a stainless container (width: about 22 cm, depth: about 28 cm, height: about 5 cm) and then heat-treated with a hot-air drying oven (produced by ETAC, MODEL: HISPEC HT320) (of which the temperature had been adjusted to 200° C.) for 30 minutes. After this heat treatment, the resultant water-absorbent resin was disintegrated to such a degree that it could pass through a JIS standard sieve having a mesh opening size of 600 μm. As a result, a surface-crosslinked water-absorbent resin was obtained.

(Operation 1-5):

An amount of 100 weight parts of the resultant surface-crosslinked water-absorbent resin was uniformly mixed with 1 weight part of aluminum sulfate hydrates (trideca- to tetradecahydrates, obtained from Sumitomo Chemical Co., Ltd.), thus obtaining an aqueous-liquid-absorbing agent (1). The physical properties of the aqueous-liquid-absorbing agent (1) are shown in Table 1.

EXAMPLE 2

An aqueous-liquid-absorbing agent (2) was obtained in the same way as of Example 1 except that the die perforation diameter of the Dome Gran in Example 1 (Operation 1-2) was changed to 1.5 mm. The physical properties of the aqueous-liquid-absorbing agent (2) are shown in Table 1.

EXAMPLE 3

An aqueous-liquid-absorbing agent (3) was obtained in the same way as of Example 1 except that: the amount of the polyethylene glycol diacrylate in Example 1 (Operation 1-1) was changed to 13.8 g (1.0 mol %); and the die perforation diameter of the Dome Gran and the rate of the pure water being added, in Example 1 (Operation 1-2), were changed to 1.5 mm and 85 g/minute respectively. The physical properties of the aqueous-liquid-absorbing agent (3) are shown in Table 1.

EXAMPLE 4

An aqueous-liquid-absorbing agent (4) was obtained in the same way as of Example 1 except that the die perforation diameter of the Dome Gran and the rate of the pure water being added, in Example 1 (Operation 1-2), were changed to 1.5 mm and 54 g/minute respectively. The physical properties of the aqueous-liquid-absorbing agent (4) are shown in Table 1.

EXAMPLE 5

An aqueous-liquid-absorbing agent (5) was obtained in the same way as of Example 1 except that: in Example 1 (Operation 1-2), the Dome Gran was replaced with a screw extruder (produced by Hiraga Kosakusho, Chopper, MODEL: TB-32 model, perforation diameter of perforated plate=3.1 mm, thickness of perforated plate=4.0 mm, number of revolutions of screw=26 rpm), and the hydrogel was supplied at 1,300 g/minute and, at the same time, pure water was supplied at 300 g/minute, thus pulverizing and agglomerating the hydrogel; and further that the 1 weight part of aluminum sulfate hydrates in Example 1 (Operation 1-5) was replaced with 2.1 weight parts of a 48 weight % aqueous aluminum sulfate solution. The physical properties of the aqueous-liquid-absorbing agent (5) are shown in Table 1.

EXAMPLE 6

An aqueous-liquid-absorbing agent (6) was obtained in the same way as of Example 1 except that the 4.4 g of the 3 weight % aqueous sodium persulfate solution in Example 1 (Operation 1-1) was replaced with 7.5 g of a 2 weight % aqueous V-50 (2,2'-azobis(2-amidinopropane) dihydrochloride) solution. The physical properties of the aqueous-liquid-absorbing agent (6) are shown in Table 1.

EXAMPLE 7

(Operation 7-1):

In a reactor as formed by lidding a jacketed stainless twin-arm kneader of 10 liters in capacity having two sigma-type blades, there was prepared a reaction liquid by dissolving 65.79 g (0.5 mol %) of polyethylene glycol diacrylate into 5,378.9 g of aqueous solution of sodium acrylate having a neutralization degree of 60 mol % (monomer concentration: 39.9 weight %). Next, this reaction liquid was deaerated under an atmosphere of nitrogen gas for 20 minutes. Subsequently, 30.19 g of 10 weight % aqueous sodium persulfate solution and 25.16 g of 0.1 weight % aqueous L-ascorbic acid solution were added thereto under stirred conditions. As a result, polymerization started after about 1 minute. Then, the polymerization was carried out in the range of 20 to 95° C. while the forming gel was pulverized. Then, the resultant hydropolymer (hydrogel) was got out after 30 minutes from the start of the polymerization. The resultant hydropolymer (hydrogel) was in the form of divided small pieces having diameters of not larger than about 5 mm.

(Operation 7-2):

The resultant hydropolymer (hydrogel) was pulverized and agglomerated with a forward extrusion type screw extrusion agglomeration machine having a spherical-surface-shaped die (Dome Gran, produced by Fuji Paudal Co., Ltd., MODEL: DG-L1, die perforation diameters=3.4 mm and 2.0 mm, ratio between numbers of perforations (3.4 mm/2.0 mm)=1:2, die thickness=1.2 mm, clearance between the extrusion action part and the die=1 mm, number of revolutions of screw=50 rpm), thus obtaining a hydropolymer having been divided into small pieces (pulverized gel particles). Incidentally, the hydropolymer was supplied at 300 g/minute.

(Operation 7-3):

The same operation as of Example 1 (Operation 1-3) was carried out. The solid content of the resultant water-absorbent resin was 95 weight %.

(Operation 7-4):

An amount of 500 weight parts of the water-absorbent resin (as obtained from the aforementioned (Operation 7-3)) was placed into Lödige Mixer (produced by Lödige, type: M5R) and then uniformly spraywise mixed with a surface-crosslinking agent solution comprising a mixed liquid of 1.5 weight parts of 1,4-butanediol, 3.0 weight parts of propylene glycol, 15.0 weight parts of pure water, and 5.0 weight parts of isopropyl alcohol under stirring. Then, the water-absorbent resin, which had been mixed with the surface-crosslinking agent solution, was placed into a stainless reactor (diameter: about 30 cm, height: about 20 cm) having a stirrer. Then, the reactor was immersed into an oil bath (of which the temperature had been adjusted to 200° C.) to carry out heat treatment under stirring for 30 minutes. After this heat treatment, the resultant water-absorbent resin was disintegrated to such a degree that it could pass through a JIS standard sieve having a mesh opening size of 600 μm. As a result, a surface-crosslinked water-absorbent resin was obtained.

(Operation 7-5):

An amount of 100 weight parts of the resultant surface-crosslinked water-absorbent resin was heated to 150° C. and then uniformly mixed with 1.6 weight parts of potassium alum (potassium aluminum sulfate dodecahydrate) under stirring for 5 minutes, thus obtaining an aqueous-liquid-absorbing agent (7). The physical properties of the aqueous-liquid-absorbing agent (7) are shown in Table 1.

EXAMPLE 8

An aqueous-liquid-absorbing agent (8) was obtained in the same way as of Example 7 except that: the 65.79 g (0.5 mol %) of polyethylene glycol diacrylate in Example 7 (Operation 7-1) was replaced with 92.11 g (0.7 mol %) of that; and the die perforation diameter of the Dome Gran in Example 7 (Operation 7-2) was changed to 1.5 mm. The physical properties of the aqueous-liquid-absorbing agent (8) are shown in Table 1.

EXAMPLE 9

An aqueous-liquid-absorbing agent (9) was obtained in the same way as of Example 7 except that the 65.79 g (0.5 mol %) of polyethylene glycol diacrylate in Example 7 (Operation 7-1) was replaced with 92.11 g (0.7 mol %) of that. The physical properties of the aqueous-liquid-absorbing agent (9) are shown in Table 1. The resultant aqueous-liquid-absorbing agent (9) had an extractable component content of 4.2 weight % and a bulk density of 0.55 g/ml.

EXAMPLE 10

The same operations as of Example 7 were carried out except that: the 65.79 g (0.5 mol %) of polyethylene glycol diacrylate in Example 7 (Operation 7-1) was replaced with 92.11 g (0.7 mol %) of that; and, in Example 7 (Operation 7-2), the Dome Gran was replaced with a screw extruder (produced by Hiraga Kosakusho, Chopper, MODEL: TB-32, perforation diameter of perforated plate=4.5 mm, thickness of perforated plate=5.0 mm, number of revolutions of screw=26 rpm), and the hydropolymer was supplied at 1,300 g/minute. However, a surface-crosslinked water-absorbent resin as obtained by the same operation as of Example 7 (Operation 7-4) was taken as aqueous-liquid-absorbing agent (10) without carrying out Example 7 (Operation 7-5). The physical properties of the aqueous-liquid-absorbing agent (10) are shown in Table 1.

EXAMPLE 11

The aqueous-liquid-absorbing agent (10) (as obtained from Example 10) was processed by the same operation as of Example 7 (Operation 7-5), thus obtaining an aqueous-liquid-absorbing agent (11). The physical properties of the aqueous-liquid-absorbing agent (11) are shown in Table 1. The resultant aqueous-liquid-absorbing agent (11) had an extractable component content of 5.7 weight % and a bulk density of 0.58 g/ml.

EXAMPLE 12

The same operations as of Example 7 were carried out except that: the 65.79 g (0.5 mol %) of polyethylene glycol diacrylate in Example 7 (Operation 7-1) was replaced with 92.11 g (0.7 mol %) of that; and, in Example 7 (Operation 7-2), the Dome Gran was replaced with a screw extruder (produced by Hiraga Kosakusho, Chopper, MODEL: TB-32 model, perforation diameter of perforated plate=4.5 mm, thickness of perforated plate=5.0 mm, number of revolutions of screw=32.5 rpm), and the rate of the hydrogel being supplied was changed to 1,300 g/minute; and further, Example 7 (Operation 7-4) was replaced with the below-mentioned (Operation 12-4); and Example 7 (Operation 7-5) was not carried out. However, a surface-crosslinked water-absorbent resin as obtained by the (Operation 12-4) was taken as aqueous-liquid-absorbing agent (12). The physical properties of the aqueous-liquid-absorbing agent (12) are shown in Table 1.

(Operation 12-4):

An amount of 500 weight parts of the resultant water-absorbent resin was uniformly mixed with a surface-crosslinking agent solution comprising a mixed liquid of 1.5 weight parts of 1,4-butanediol, 3.0 weight parts of propylene glycol, and 15.0 weight parts of pure water, and then the resultant mixture was heat-treated at 200° C. for 30 minutes. Furthermore, the resultant particles were disintegrated to such a degree that they could pass through a JIS standard sieve having a mesh opening size of 600 μm. As a result, a surface-crosslinked water-absorbent resin was obtained. The resultant surface-crosslinked water-absorbent resin was taken as aqueous-liquid-absorbing agent (12).

EXAMPLE 13

A surface-crosslinked water-absorbent resin was obtained by carrying out the same operations as of Example 12 except that the surface-crosslinking agent solution in Example 12 (Operation 12-4) was replaced with a surface-crosslinking agent solution comprising a mixed liquid of 2.3 weight parts of 1,4-butanediol, 4.5 weight parts of propylene glycol, and 22.5 weight parts of pure water. The resultant surface-crosslinked water-absorbent resin was processed by the same operation as of Example 7 (Operation 7-5), thus obtaining an aqueous-liquid-absorbing agent (13). The physical properties of the aqueous-liquid-absorbing agent (13) are shown in Table 1. The resultant aqueous-liquid-absorbing agent (13) had an extractable component content of 0.3 weight % and a bulk density of 0.54 g/ml.

EXAMPLE 14

An aqueous-liquid-absorbing agent (14) was obtained in the same way as of Example 7 except that: the 65.79 g (0.5 mol %) of polyethylene glycol diacrylate in Example 7 (Operation 7-1) was replaced with 92.11 g (0.7 mol %) of that; and, in Example 7 (Operation 7-2), the Dome Gran was replaced with a screw extruder (produced by Hiraga Kosakusho, Chopper, MODEL: TB-32 model, perforation diameter of perforated plate=2.4 mm, thickness of perforated plate=5.0 mm, number of revolutions of screw=32.5 rpm), and the rate of the hydrogel being supplied was changed to 1,300 g/minute. The physical properties of the aqueous-liquid-absorbing agent (14) are shown in Table 1.

EXAMPLE 15

The same operations as of Example 7 were carried out except that: the 65.79 g (0.5 mol %) of polyethylene glycol diacrylate in Example 7 (Operation 7-1) was replaced with 46.06 g (0.35 mol %) of that and 8.11 g (0.35 mol %) of glycerol; and, in Example 7 (Operation 7-2), the Dome Gran was replaced with a screw extruder (produced by Hiraga Kosakusho, Chopper, MODEL: TB-32 model, perforation diameter of perforated plate=4.5 mm, thickness of perforated plate=5.0 mm, number of revolutions of screw=32.5 rpm), and the rate of the hydrogel being supplied was changed to 1,300 g/minute. However, a surface-crosslinked water-absorbent resin as obtained by the same operation as of Example 7 (Operation 7-4) was taken as aqueous-liquid-absorbing agent (15) without carrying out Example 7 (Operation 7-5). The physical properties of the aqueous-liquid-absorbing agent (15) are shown in Table 2.

EXAMPLE 16

The aqueous-liquid-absorbing agent (15) (as obtained from Example 15) was processed by the same operation as of Example 7 (Operation 7-5), thus obtaining an aqueous-liquid-absorbing agent (16). The physical properties of the aqueous-liquid-absorbing agent (16) are shown in Table 2.

EXAMPLE 17

An aqueous-liquid-absorbing agent (17) was obtained in the same way as of Example 7 except that: the (Operation 7-2) in Example 7 was omitted; and Example 7 (Operation 7-5) was replaced with the below-mentioned (Operation 17-5). The physical properties of the aqueous-liquid-absorbing agent (17) are shown in Table 2.

(Operation 17-5):

An amount of 100 weight parts of the resultant surface-crosslinked water-absorbent resin was uniformly mixed with 1.6 weight parts of potassium alum (potassium aluminum sulfate dodecahydrate).

EXAMPLE 18

An aqueous-liquid-absorbing agent (18) was obtained in the same way as of Example 7 except that: in Example 7 (Operation 7-2), the Dome Gran was replaced with a screw extruder (produced by Hiraga Kosakusho, Chopper, MODEL: TB-32 model, perforation diameter of perforated plate=9.5 mm, thickness of perforated plate=5.0 mm, number of revolutions of screw=32.5 rpm), and the rate of the hydrogel being supplied was changed to 1,300 g/minute; and further, Example 7 (Operation 7-5) was replaced with the aforementioned (Operation 17-5). The physical properties of the aqueous-liquid-absorbing agent (18) are shown in Table 2.

EXAMPLE 19

An aqueous-liquid-absorbing agent (19) was obtained in the same way as of Example 1 except that: the 4.4 g of the 3 weight % aqueous sodium persulfate solution in Example 1 (Operation 1-1) was replaced with 9.8 g of a 15 weight % aqueous V-50 (2,2'-azobis(2-amidinopropane) dihydrochloride) solution; and Example 1 (Operation 1-2) was modified to cut the hydropolymer into the size of 3 cm in length and 1 cm in width with scissors; and further, Example 1 (Operation 1-5) was replaced with the aforementioned (Operation 17-5). The physical properties of the aqueous-liquid-absorbing agent (19) are shown in Table 2.

EXAMPLE 20

An aqueous-liquid-absorbing agent (20) was obtained in the same way as of Example 7 except that: the 65.79 g (0.5 mol %) of polyethylene glycol diacrylate in Example 7 (Operation 7-1) was replaced with 13.16 g (0.10 mol %) of that and 13.90 g (0.60 mol %) of glycerol; and, in Example 7 (Operation 7-2), the Dome Gran was replaced with a screw extruder (produced by Hiraga Kosakusho, Chopper, MODEL: TB-32 model, perforation diameter of perforated plate=4.5 mm, thickness of perforated plate=5.0 mm, number of revolutions of screw=32.5 rpm), and the rate of the hydrogel being supplied was changed to 1,300 g/minute; and further, the (Operation 7-4) was replaced with the (Operation 12-4). The physical properties of the aqueous-liquid-absorbing agent (20) are shown in Table 2.

EXAMPLE 21

An aqueous-liquid-absorbing agent (21) was obtained in the same way as of Example 7 except that: the 65.79 g (0.5 mol %) of polyethylene glycol diacrylate in Example 7 (Operation 7-1) was replaced with 131.59 g (1.0 mol %) of that; and, in Example 7 (Operation 7-2), the Dome Gran was replaced with a screw extruder (produced by Hiraga Kosakusho, Chopper, MODEL: TB-32 model, perforation diameter of perforated plate=4.5 mm, thickness of perforated plate=5.0 mm, number of revolutions of screw=15 rpm), and the rate of the hydrogel being supplied was changed to 600 g/minute. The physical properties of the aqueous-liquid-absorbing agent (21) are shown in Table 2.

EXAMPLE 22

An aqueous-liquid-absorbing agent (22) was obtained in the same way as of Example 7 except that: the 65.79 g (0.5 mol %) of polyethylene glycol diacrylate in Example 7 (Operation 7-1) was replaced with 6.58 g (0.05 mol %) of that and 20.43 g (0.7 mol %) of 2-hydroxyethyl acrylate; and, in Example 7 (Operation 7-2), the Dome Gran was replaced with a screw extruder (produced by Hiraga Kosakusho, Chopper, MODEL: TB-32 model, perforation diameter of perforated plate=4.5 mm, thickness of perforated plate=5.0 mm, number of revolutions of screw=32.5 rpm), and the rate of the hydrogel being supplied was changed to 1,300 g/minute. The physical properties of the aqueous-liquid-absorbing agent (22) are shown in Table 2.

COMPARATIVE EXAMPLE 1

(Operation c1-1):
In a polypropylene-made container of 80 mm in inner diameter and 1 liter in capacity as covered with polystyrene foam being a heat insulator, a solution (B) was quickly added to a solution (A) under stirring with a magnetic stirrer in an open system to mix them together, thus obtaining an aqueous monomer solution. Hereupon, the solution (A) had been prepared by mixing 185.40 g of acrylic acid, 1.35 g (0.1 mol %) of polyethylene glycol diacrylate (molecular weight: 523), and 1.13 g of a 1.0 weight % aqueous pentasodium diethylenetriaminepentaacetate solution together. And the solution (B) had been prepared by mixing 148.53 g of a 48.5 weight % aqueous sodium hydroxide solution and 159.31 g of ion-exchanged water (of which the temperature had been adjusted to 50° C.) together. As to the aqueous monomer solution, its liquid temperature rose to about 100° C. due to the neutralization heat and the dissolution heat.

Furthermore, 4.29 g of a 3 weight % aqueous sodium persulfate solution was added to this aqueous monomer solution to stir them together for several seconds. Immediately thereafter, the resultant mixture was poured into a stainless vat type container (having: a surface temperature as heated to 100° C. with a hot plate (NEO HOTPLATE H1-1000, produced by Inouchiseieido K.K.); an inner surface as coated with Teflon (registered trademark); and a bottom of 250×250 mm) in an open system. The stainless vat type container is such that: the size is bottom=250×250 mm, top=640×640 mm, height=50 mm; the central section is trapezoidal; and the top is open.

Shortly after the above pouring of the aqueous monomer solution into the vat, polymerization started. While water vapor was emitted with expansion in all directions and foaming, the polymerization proceeded. Thereafter, there occurred a shrinkage to the size a little larger than the bottom. These expansion and shrinkage had ended within about 1 minute. Then, after having been retained in the polymerization container for 4 minutes, the resultant hydropolymer (hydrogel) was got out.

(Operation c1-2):
The resultant hydropolymer (hydrogel) was cut into the shape of rectangles of 3 cm in width and then pulverized with a screw extruder (produced by Hiraga Kosakusho, Chopper, MODEL: TB-32 model, perforation diameter of perforated plate=9.5 mm, thickness of perforated plate=5.0 mm, number of revolutions of screw=32.5 rpm), thus obtaining a hydropolymer having been divided into small pieces (pulverized gel particles). When the above pulverization and agglomeration were carried out with the extrusion agglomeration machine, they were carried out while pure water was added at 300 g/minute. Incidentally, the rate of the hydrogel being supplied was 1,300 g/minute.

(Operation c1-3):
The resultant pulverized gel particles having been divided into small pieces were spread onto a metal gauze of 50 meshes and then dried with hot air of 180° C. for 40 minutes. Next, the dried product was pulverized with a roll mill and then classified with a JIS standard sieve having a mesh opening size of 600 μm, thus obtaining a water-absorbent resin of an irregularly pulverized shape, which had a weight-average particle diameter of 330 μm and a logarithmic standard deviation (σζ) of 0.35.

(Operation c1-4):
An amount of 100 weight parts of the resultant water-absorbent resin was uniformly mixed with a surface-crosslinking agent solution comprising a mixed liquid of 0.3 weight part of 1,4-butanediol, 0.6 weight part of propylene glycol, 3.0 weight parts of pure water, and 1.0 weight part of isopropyl alcohol. Then, the water-absorbent resin, which had been mixed with the surface-crosslinking agent solution, was uniformly spread into a stainless container (width: about 22 cm, depth: about 28 cm, height: about 5 cm) and then heat-treated with a hot-air drying oven (produced by ETAC, MODEL: HISPEC HT320) (of which the temperature had been adjusted to 200° C.) for 30 minutes. After this heat treatment, the resultant water-absorbent resin was disintegrated to such a degree that it could pass through a JIS standard sieve having a mesh opening size of 600 μm. As a result, a surface-crosslinked water-absorbent resin was obtained.

(Operation c1-5):
An amount of 100 weight parts of the resultant surface-crosslinked water-absorbent resin was heated to 150° C. and then uniformly mixed with 1.6 weight parts of potassium alum (potassium aluminum sulfate dodecahydrate) under stirring for 5 minutes, thus obtaining a comparative aqueous-liquid-absorbing agent (1). The physical properties of the comparative aqueous-liquid-absorbing agent (1) are shown in Table 2.

COMPARATIVE EXAMPLE 2

The perforation diameter of the perforated plate of the screw extruder (produced by Hiraga Kosakusho, Chopper, MODEL: TB-32 model, perforation diameter of perforated plate=9.5 mm, thickness of perforated plate=5.0 mm, number of revolutions of screw=32.5 rpm) in Comparative Example 1 (Operation c1-2) was changed to 2.4 mm. In this case of perforation diameter=2.4 mm, the hydropolymer (hydrogel) could not be pulverized, but unfavorably clogged up the screw extruder.

COMPARATIVE EXAMPLE 3

A comparative aqueous-liquid-absorbing agent (3) was obtained in the same way as of Example 7 except that: the aqueous solution of sodium acrylate in Example 7 (Operation 7-1) was replaced with 5,433.2 g of aqueous solution of sodium acrylate having a neutralization degree of 70 mol % (monomer concentration: 39.5 weight %); the amount of the polyethylene glycol diacrylate in Example 7 (Operation 7-1) was changed to 12.83 g (0.1 mol %); the amount of the 10 weight % aqueous sodium persulfate solution in Example 7 (Operation 7-1) was changed to 29.43 g; the amount of the 0.1 weight % aqueous L-ascorbic acid solution in Example 7 (Operation 7-1) was changed to 24.53 g; the operation of Example 7 (Operation 7-2) was omitted; and Example 7 (Operation 7-5) was replaced with the same operation as of Example 1 (Operation 1-5). The physical properties of the comparative aqueous-liquid-absorbing agent (3) are shown in Table 2. Incidentally, the resultant comparative aqueous-liquid-absorbing agent (3) had a bulk density of 0.68 g/ml.

COMPARATIVE EXAMPLE 4

A comparative aqueous-liquid-absorbing agent (4) was obtained in the same way as of Example 7 except that: the amount of the aqueous solution of sodium acrylate in Example 7 (Operation 7-1) was changed to 5,385.1 g (monomer concentration: 37.8 weight %); the amount of the polyethylene glycol diacrylate in Example 7 (Operation 7-1) was changed to 62.42 g (0.5 mol %); the amount of the 10 weight % aqueous sodium persulfate solution in Example 7 (Operation 7-1) was changed to 28.64 g; the amount of the 0.1 weight % aqueous L-ascorbic acid solution in Example 7 (Operation 7-1) was changed to 23.87 g; the operation of Example 7 (Operation 7-2) was omitted; the JIS standard sieve having a mesh opening size of 600 μm in Example 7 (Operation 7-3) was replaced with a JIS standard sieve having a mesh opening size of 850 μm; the JIS standard sieve having a mesh opening size of 600 μm in (Operation 7-4) was replaced with a JIS standard sieve of 850 μm; and Example 7 (Operation 7-5) was replaced with the same operation as of Example 1 (Operation 1-5). The physical properties of the comparative aqueous-liquid-absorbing agent (4) are shown in Table 2.

COMPARATIVE EXAMPLE 5

A comparative aqueous-liquid-absorbing agent (5) was obtained in the same way as of Comparative Example 4 except that, as the water-absorbent resin resultant from (Operation 7-3), there was used a water-absorbent resin which had been passed through a JIS standard sieve having a mesh opening size of 300 μm in place of the classification with the JIS standard sieves having mesh opening sizes of 850 μm and 150 μm in (Operation 7-3) (this water-absorbent resin included particles not larger than 150 μm in an amount of 13 weight %). The physical properties of the comparative aqueous-liquid-absorbing agent (5) are shown in Table 2.

COMPARATIVE EXAMPLE 6

The same operations as of Example 7 were carried out except that: the 65.79 g (0.5 mol %) of polyethylene glycol diacrylate in Example 7 (Operation 7-1) was replaced with 92.11 g (0.7 mol %) of that; and, in Example 7 (Operation 7-2), the Dome Gran was replaced with a screw extruder (produced by Hiraga Kosakusho, Chopper, MODEL: TB-32 model, perforation diameter of perforated plate=4.5 mm, thickness of perforated plate=5.0 mm, number of revolutions of screw=32.5 rpm), and the rate of the hydrogel being supplied was changed to 1,300 g/minute; and further, a water-absorbent resin, resultant from the (Operation 7-3) with carrying out neither (Operation 7-4) nor (Operation 7-5) which are described in Example 7, was taken as comparative aqueous-liquid-absorbing agent (6). The physical properties of the comparative aqueous-liquid-absorbing agent (6) are shown in Table 2.

COMPARATIVE EXAMPLE 7

The same operations as of Example 7 were carried out except that: the 65.79 g (0.5 mol %) of polyethylene glycol diacrylate in Example 7 (Operation 7-1) was replaced with 92.11 g (0.7 mol %) of that; and, in Example 7 (Operation 7-2), the Dome Gran was replaced with a screw extruder (produced by Hiraga Kosakusho, Chopper, MODEL: TB-32 model, perforation diameter of perforated plate=4.5 mm, thickness of perforated plate=5.0 mm, number of revolutions of screw=32.5 rpm), and the hydrogel was supplied at 1,300 g/minute and, at the same time, glycerol was supplied at 300 g/minute; and further, the (Operation 7-3) and (Operation 7-5) were carried out, but the (Operation 7-4) was not carried out. Then, the resultant water-absorbent resin particles were taken as comparative aqueous-liquid-absorbing agent (7). The physical properties of the comparative aqueous-liquid-absorbing agent (7) are shown in Table 2.

TABLE 1

| | Amount of internal-crosslinking agent (mol %) | Gel pulverizer | Perforation diameter of perforated plate (mm) | CRC (g/g) | SFC ($\times 10^{-7}$ cm$^3 \cdot$ s/g) | FSR (g/g/s) | Wet Porosity (%) | AAP (g/g) | D50 (μm) | σζ | Ratio of 150-600 μm (weight %) | Ratio of 150-500 μm (weight %) | AAP/CRC |
|---|---|---|---|---|---|---|---|---|---|---|---|---|---|
| Aqueous-liquid-absorbing agent (1) | 0.5 | DG | 1.2 | 12.7 | 800 | 0.50 | 38.5 | 16.2 | 331 | 0.32 | 98.7 | 98.7 | 1.28 |
| Aqueous-liquid-absorbing agent (2) | 0.5 | DG | 1.5 | 14.2 | 871 | 0.50 | 38.6 | 17.3 | 335 | 0.35 | 96.4 | 90.9 | 1.22 |
| Aqueous-liquid-absorbing agent (3) | 1.0 | DG | 1.5 | 12.4 | 505 | 1.82 | 37.1 | 14.5 | 330 | 0.32 | 98.1 | 98.1 | 1.17 |
| Aqueous-liquid-absorbing agent (4) | 0.5 | DG | 1.5 | 14.0 | 407 | 2.00 | 32.6 | 17.1 | 314 | 0.35 | 96.2 | 93.9 | 1.22 |
| Aqueous-liquid-absorbing agent (5) | 0.5 | MC | 3.1 | 14.5 | 510 | 0.95 | 36.5 | 16.7 | 325 | 0.34 | 96.5 | 94.0 | 1.15 |

TABLE 1-continued

| | Amount of internal-crosslinking agent (mol %) | Gel pulverizer | Perforation diameter of perforated plate (mm) | CRC (g/g) | SFC (×10⁻⁷ cm³·s/g) | FSR (g/g/s) | Wet Porosity (%) | AAP (g/g) | D50 (μm) | σζ | Ratio of 150-600 μm (weight %) | Ratio of 150-500 μm (weight %) | AAP/CRC |
|---|---|---|---|---|---|---|---|---|---|---|---|---|---|
| Aqueous-liquid-absorbing agent (6) | 0.5 | DG | 1.2 | 12.7 | 611 | 0.69 | 35.1 | 16.1 | 332 | 0.32 | 99.1 | 93.9 | 1.27 |
| Aqueous-liquid-absorbing agent (7) | 0.5 | DG | 3.4/2.0 | 13.1 | 732 | 0.43 | 35.2 | 16.9 | 308 | 0.36 | 98.6 | 98.6 | 1.29 |
| Aqueous-liquid-absorbing agent (8) | 0.7 | DG | 1.5 | 13.4 | 447 | 0.99 | 37.7 | 17.7 | 308 | 0.36 | 98.3 | 96.3 | 1.32 |
| Aqueous-liquid-absorbing agent (9) | 0.7 | DG | 3.4/2.0 | 11.7 | 710 | 0.35 | 39.0 | 15.1 | 324 | 0.32 | 98.4 | 94.9 | 1.29 |
| Aqueous-liquid-absorbing agent (10) | 0.7 | MC | 4.5 | 12.7 | 408 | 0.27 | 33.8 | 16.3 | 336 | 0.35 | 97.5 | 93.5 | 1.28 |
| Aqueous-liquid-absorbing agent (11) | 0.7 | MC | 4.5 | 11.9 | 762 | 0.24 | 35.9 | 15.5 | 340 | 0.33 | 97.9 | 93.5 | 1.30 |
| Aqueous-liquid-absorbing agent (12) | 0.7 | MC | 4.5 | 12.6 | 450 | 0.33 | 28.9 | 16.0 | 341 | 0.33 | 98.7 | 94.3 | 1.27 |
| Aqueous-liquid-absorbing agent (13) | 0.7 | MC | 4.5 | 12.1 | 1000 | 0.34 | 39.0 | 14.8 | 350 | 0.25 | 99.9 | 95.8 | 1.22 |
| Aqueous-liquid-absorbing agent (14) | 0.7 | MC | 2.4 | 12.4 | 529 | 0.67 | 37.0 | 14.3 | 345 | 0.33 | 98.3 | 91.8 | 1.15 |

Gel pulverizer:
DG (forward extrusion type screw extrusion agglomeration machine having a spherical-surface-shaped die (Dome Gran, produced by Fuji Paudal Co., Ltd.))
MC (screw extruder (produced by Hiraga Kosakusho, Chopper))

TABLE 2

| | Amount of internal-crosslinking agent (mol %) | Gel pulverizer | Perforation diameter of perforated plate (mm) | CRC (g/g) | SFC (×10⁻⁷ cm³·s/g) | FSR (g/g/s) | Wet Porosity (%) | AAP (g/g) | D50 (μm) | σζ | Ratio of 150-600 μm (weight %) | Ratio of 150-500 μm (weight %) | AAP/CRC |
|---|---|---|---|---|---|---|---|---|---|---|---|---|---|
| Aqueous-liquid-absorbing agent (15) | 0.7 | MC | 4.5 | 11.1 | 510 | 0.35 | 34.2 | 13.5 | 322 | 0.36 | 97.4 | 94.7 | 1.22 |
| Aqueous-liquid-absorbing agent (16) | 0.7 | MC | 4.5 | 11.0 | 1040 | 0.30 | 39.5 | 17.1 | 323 | 0.35 | 97.6 | 94.8 | 1.55 |
| Aqueous-liquid-absorbing agent (17) | 0.5 | None | — | 10.0 | 1017 | 0.20 | 30.9 | 18.0 | 329 | 0.39 | 96.7 | 91.5 | 1.80 |
| Aqueous-liquid-absorbing agent (18) | 0.5 | MC | 9.5 | 13.9 | 557 | 0.23 | 29.8 | 16.3 | 334 | 0.37 | 97.0 | 93.8 | 1.17 |
| Aqueous-liquid-absorbing agent (19) | 0.5 | Scissors | — | 13.0 | 403 | 0.39 | 31.5 | 16.3 | 333 | 0.34 | 99.0 | 98.0 | 1.25 |
| Aqueous-liquid-absorbing agent (20) | 0.7 | MC | 4.5 | 10.1 | 953 | 0.24 | 37.7 | 17.5 | 324 | 0.36 | 97.5 | 94.7 | 1.73 |
| Aqueous-liquid-absorbing agent (21) | 1.0 | MC | 4.5 | 10.8 | 501 | 0.70 | 37.2 | 17.4 | 347 | 0.33 | 98.4 | 91.6 | 1.61 |
| Aqueous-liquid-absorbing agent (22) | 0.75 | MC | 4.5 | 10.0 | 1215 | 0.20 | 38.1 | 18.2 | 323 | 0.36 | 97.3 | 94.6 | 1.82 |
| Comparative aqueous-liquid-absorbing agent (1) | 0.1 | MC | 9.5 | 25.8 | 140 | 0.37 | 34.2 | 23.1 | 331 | 0.32 | 96.0 | 93.0 | 0.90 |
| Comparative aqueous-liquid-absorbing agent (2) | 0.1 | MC | 2.4 | — | — | — | — | — | — | — | — | — | — |
| Comparative aqueous-liquid-absorbing agent (3) | 0.1 | — | — | 25.6 | 104 | 0.36 | 34.0 | 23.0 | 323 | 0.36 | 97.2 | 94.5 | 0.90 |
| Comparative aqueous-liquid-absorbing agent (4) | 0.5 | — | — | 15.9 | 847 | 0.13 | 35.2 | 15.5 | 461 | 0.44 | 67.2 | 52.2 | 0.97 |
| Comparative aqueous-liquid-absorbing agent (5) | 0.5 | — | — | 13.8 | 347 | 0.35 | 14.3 | 13.5 | 210 | 0.15 | 87.0 | 87.0 | 0.98 |
| Comparative aqueous-liquid-absorbing agent (6) | 0.7 | MC | 4.5 | 18.0 | 8 | 0.35 | 16.2 | 17.0 | 308 | 0.36 | 98.7 | 95.6 | 0.94 |
| Comparative aqueous-liquid-absorbing agent (7) | 0.7 | MC | 4.5 | 10.6 | 317 | 0.30 | 28.1 | 11.0 | 319 | 0.37 | 97.5 | 96.5 | 1.04 |

Gel pulverizer:
DG (forward extrusion type screw extrusion agglomeration machine having a spherical-surface-shaped die (Dome Gran, produced by Fuji Paudal Co., Ltd.))
MC (screw extruder (produced by Hiraga Kosakusho, Chopper))

INDUSTRIAL APPLICATION

In the present invention, for example, if the absorbent structures in the sanitary materials such as diapers are constituted by containing the aqueous-liquid-absorbing agent according to the present invention, then, in the uses of the sanitary materials and in other uses, the great exercise can be done such that the sanitary materials can be thinned, because: the aqueous liquid can rapidly be absorbed, and also, the aqueous liquid can be diffused through a still wider range, and further, the aqueous liquid can be retained in an amount of not smaller than is absorbed by the aqueous-liquid-absorbing agent.

The invention claimed is:

1. An aqueous-liquid-absorbing agent, which is an aqueous-liquid-absorbing agent comprising water-absorbent resin particles as essential components, wherein the water-absorbent resin particles are obtained by a process including the steps of polymerizing a water-soluble ethylenically unsaturated monomer including acrylic acid and/or its salt in an amount of 50 to 100 mol % and have a crosslinked structure in their inside; with the aqueous-liquid-absorbing agent exhibiting an absorption rate (FSR) of not less than 0.2 g/g/s, a water absorption capacity (CRC) of 10 to 20 g/g, a saline flow conductivity (SFC) of not less than $400 \times 10^{-7}$ cm$^3$·s/g, and a wet porosity of not less than 20% Furthermore, said aqueous-liquid-absorbing agent is a particulate shape and of which not less than 90 weight % is in the form of particles having particle diameters in the range of 150 to 600 μm.

2. An aqueous-liquid-absorbing agent according to claim 1, wherein at least a portion of the water-absorbent resin particles are agglomerate particles.

3. An aqueous-liquid-absorbing agent according to claim 1, wherein the water-absorbent particles are surface-crosslinked ones.

4. An aqueous-liquid-absorbing agent according to claim 1, which further comprises a liquid-permeability-enhancing agent.

* * * * *